US012568926B2

(12) United States Patent
Lee et al.

(10) Patent No.: US 12,568,926 B2
(45) Date of Patent: ***Mar. 10, 2026

(54) ANIMAL LITTER BOX AND FEEDER

(71) Applicant: LeapHigh Animals, LLC, Las Vegas, NV (US)

(72) Inventors: Si Hyung Lee, Henderson, NV (US); Sean Sangil Hahn, Henderson, NV (US)

(73) Assignee: LeapHigh Animals, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/787,742

(22) Filed: Jul. 29, 2024

(65) Prior Publication Data

US 2025/0113799 A1 Apr. 10, 2025

Related U.S. Application Data

(63) Continuation-in-part of application No. 18/377,716, filed on Oct. 6, 2023, now Pat. No. 12,048,289.

(51) Int. Cl.
| | |
|---|---|
| *A01K 1/01* | (2006.01) |
| *A01K 1/015* | (2006.01) |
| *A01K 5/01* | (2006.01) |
| *A01K 1/03* | (2006.01) |

(52) U.S. Cl.
CPC .......... *A01K 1/0114* (2013.01); *A01K 1/0155* (2013.01); *A01K 5/0114* (2013.01); *A01K 1/032* (2013.01)

(58) Field of Classification Search
CPC .. A01K 1/0114; A01K 1/0155; A01K 5/0114; A01K 1/032
See application file for complete search history.

(56) References Cited

U.S. PATENT DOCUMENTS

| | | | |
|---|---|---|---|
| 4,217,857 A | 8/1980 | Geddie | |
| 4,303,039 A | 12/1981 | Thibault | |
| 4,771,731 A | 9/1988 | Derx et al. | |
| 5,058,528 A | 10/1991 | Counseller | |
| 5,168,834 A * | 12/1992 | Buschur ............... | A01K 1/0114 209/251 |

(Continued)

FOREIGN PATENT DOCUMENTS

| | | | |
|---|---|---|---|
| GB | 2408668 A | 6/2005 | |

*Primary Examiner* — Ebony E Evans
(74) *Attorney, Agent, or Firm* — Lempia Summerfield Katz LLC

(57) ABSTRACT

An animal litter box and feeder are disclosed. Animals, such as rabbits, typically have an animal litter box and an animal feeder. The litter box disclosed is a multi-layer structure including a lower layer, at least one middle layer, and an upper layer. The lower layer is more rigid than one or both of the upper layer and the at least one middle layer, and composed of different materials than one or both of the upper layer and the at least one middle layer. For example, the lower layer may be rigid and composed of hard plastic, the upper layer may be semi-rigid and composed of paper, and the at least one middle layer may be non-rigid and composed of plastic. The multi-layer configuration for the animal litter box may be used in combination with an animal feeder in order to provide a combination animal litter box and feeder.

18 Claims, 40 Drawing Sheets

(56)  References Cited

U.S. PATENT DOCUMENTS

| | | | |
|---|---|---|---|
| 5,909,717 A | | 6/1999 | Randall |
| 8,733,287 B2 | | 5/2014 | Huck |
| 9,137,967 B2 | | 9/2015 | Lathim |
| 9,204,617 B2 * | | 12/2015 | Yamamoto ........... A01K 1/0114 |
| D769,548 S | | 10/2016 | Spiegel |
| 10,477,831 B2 | | 11/2019 | Beaudoin et al. |
| 2006/0042551 A1 * | | 3/2006 | Moran ................. A01K 1/0107 |
| | | | 119/166 |
| 2006/0065203 A1 | | 3/2006 | Schmidt et al. |
| 2006/0196438 A1 | | 9/2006 | Caputa et al. |
| 2008/0314328 A1 | | 12/2008 | Johnson |
| 2016/0183492 A1 * | | 6/2016 | Norman ............... A01K 1/0114 |
| | | | 119/166 |
| 2019/0343066 A1 | | 11/2019 | Fan et al. |
| 2021/0185974 A1 * | | 6/2021 | Cunningham ......... A01K 1/011 |

* cited by examiner

ANIMAL LITTER BOX AND FEEDER

REFERENCE TO RELATED APPLICATION

This application is a continuation-in-part application of U.S. application Ser. No. 18/377,716, which is incorporated by reference herein in its entirety.

TECHNICAL FIELD

The invention relates to an animal litter box and feeder.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

The rabbit is a common household pet, being docile by nature, friendly, and affectionate in response to handling and feeding. Care for the rabbit typically includes providing a form of litter box. The litter box may include shredded paper, wood shavings, hay, or grass. Care for the rabbit also typically includes a feeder, such as a box or the like that includes hay or grass.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIG. 12A is a front perspective view (with cutaway) of one example of the clip structure.

FIG. 12B is a front perspective view (with cutaway) of the example depicted in FIG. 12A of the clip structure, with one side modified.

FIG. 12C is a top view of the clip structure (as depicted in FIG. 12A) on the upper layer.

DETAILED DESCRIPTION OF EMBODIMENTS

Overview

Figure 1A:
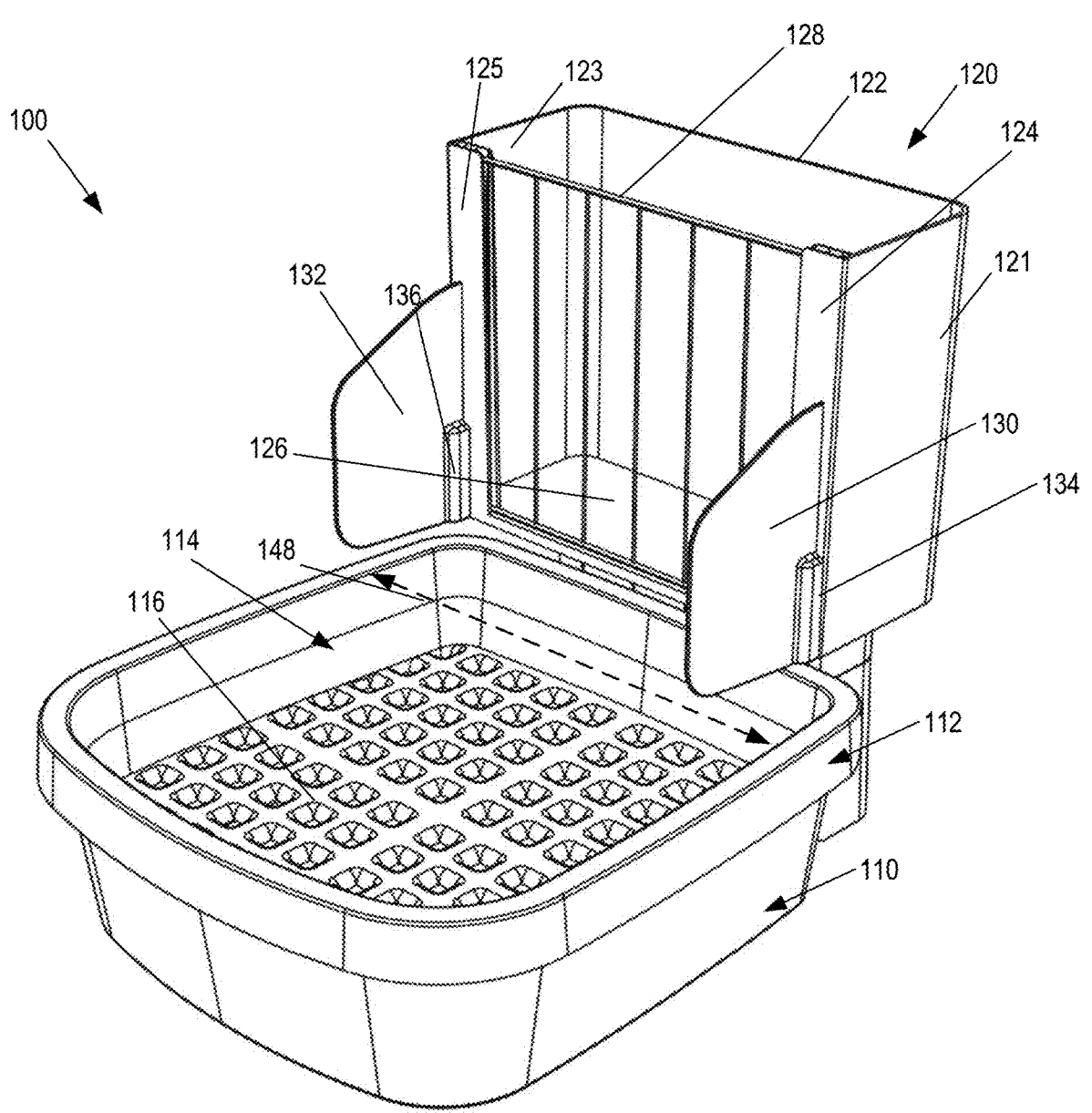
FIG. 1A is a front perspective view of the rabbit litter box and feeder section.

Domesticated animals typically have some type of animal litter boxes (interchangeably termed sandboxes, litter collection pan, or the like) and/or animal feeders. For example, rabbits typically thrive in an environment that has suitable litter boxes and feeders. However, typical rabbit litter boxes suffers from several drawbacks. First, typical litter boxes, such as those that use wood or shredded paper, results in the rabbit living in its own waste (e.g., urine and feces), leading to a potentially unhealthy situation. Second, wood or shredded paper results in a considerable amount of waste. Third, wood or shredded paper, needing to be replaced periodically, resulting in a big expense. Fourth, rabbit litter boxes typically results in the waste/hay/shredded paper being kicked out and into the household.

Various forms and combinations of animal litter boxes and animal feeders, either alone or in combination, are envisioned. The below discussion focuses on rabbit litter boxes and/or rabbit feeders. Nevertheless, any discussion regarding rabbit litter boxes and/or rabbit feeders may be equally applied to other forms of animal litter boxes and/or animal feeders. In one implementation, the animal litter box may comprise at least three layers, with the layers working in combination. In one or some embodiments, the three layers comprise an upper layer (such as an uppermost layer), at least one middle layer (such as a single middle layer), and a lower layer (such as a bottom layer that is closest to and/or touching ground). In another implementation, the animal litter box may comprise at least four layers, with the layers working in combination. In one or some embodiments, the four layers comprise an upper layer (such as an uppermost layer), one or more middle layers (such one or both of a bracing structure or a bag), and a lower layer (such as a bottom layer that is closest to and/or touching ground). In still another implementation, the animal litter box may comprise at least five layers, with the layers working in combination. In one or some embodiments, the five layers comprise a clip layer (comprising one or more clip structures), an upper layer, one or more middle layers (such one or both of a bracing structure or a bag), and a lower layer (such as a bottom layer that is closest to and/or touching ground). In this regard, the animal litter box may comprise any one, any combination, or all (and in any order) of: one or more clips; an upper layer (e.g., a cellulose structure with holes); a bracing structure (e.g., comprising single bracing structure(s) with a single crossbeam (alternatively termed a crossbeam structure) and/or a unitary bracing structure, such as a single unitary structure, comprising multiple crossbeams); a bag (e.g., a plastic bag); or a lower layer (e.g., a plastic and/or a metal lower layer).

More specifically, in one or some embodiments, a multi-layer system may be used and may include the upper layer, one or more middle layers, and the lower layer being any one, any combination, or all of: (i) different materials (e.g., each of the upper layer, the at least one middle layer, and the lower layer are different materials; the at least one middle layer (e.g., the bag) is a different material from the upper layer and the lower layer, which may both be of the same material or may still be different materials); (ii) different rigidities or flexibilities (e.g., each of the upper layer, the at least one middle layer, and the lower layer have different rigidities, with one middle layer being the least rigid (e.g., the bag being less rigid than both the upper layer and the lower layer) and/or with one middle layer being more rigid (e.g., the bracing structure being more rigid than the upper layer), the lower layer being the most rigid, and the upper layer have a rigidity in between the at least one middle layer and the lower layer; the at least one middle layer has a lower rigidity than both the upper layer and the lower layer, which may both have the same rigidity); (iii) different textures (e.g., smooth texture versus non-smooth texture (e.g., corrugated; crenelated; ridged; ribbed; grooved; wrinkled)); (iv) different levels of reusability (e.g., disposable after one usage; configured to be cleaned, such as with soap and water; the upper layer (which may be a paper tray) may be wiped clean and/or dumped into a trash can in order to be used multiple times and then disposed, whereas the bag is disposed without cleaning, and whereas the lower layer (which may be composed of hard plastic or metal) may be washed with soap and water and is not considered disposable; etc.); (v) different ways to connect to one another (e.g., the middle layer(s) are flexibly draped over an edge of the lower layer (and potentially cinched using a drawstring); the upper layer is placed on top of the flexibly draped/cinched middle layer and/or on the bracing structure); or (vi) different ways to connect to other parts of the device (e.g., the lower layer may be connected to a feeder portion whereas the upper layer and/or the middle layer(s) are not connected to the feeder portion; the clip structure(s) may clip the upper layer to the lower layer and/or may prevent the animal from chewing on the rim of the upper layer).

As one example, in one embodiment, the upper layer may be semi-rigid and may comprise a paper-based product (e.g., made from cellulose fibers derived from wood, hemp, grasses, or other vegetable sources). Alternatively, the upper layer may comprise a non-paper-based product, such as hard plastic (e.g., polyethylene, such as LDPE, LLDPE, or the like). In one or some embodiments, the upper layer may include one or more holes, such as a plurality of holes to form a pattern. As discussed further, any one, any combination, or all of the size, shape, or pattern of the holes may be used so that urine and/or feces may pass through the upper layer and be captured in the at least one middle layer. In this way, the rabbit does not sit in its filth. Alternatively, or in addition, the upper layer may be any one, any combination, or all of: corrugated; crenelated; ridged; ribbed; grooved; wrinkled; formed in folds; or uneven. In this way, the upper layer, formed as a paper tray (or other type of cellulose-based tray), may have added strength and rigidity. In addition, in one or some embodiments, the upper layer may be considered single use, in which the upper layer is not configured for washing with soap and water (instead having sufficient rigidity so that the upper layer may be removed from the animal litter box, its contents tipped into a trash can, and then placed back on top of a new plastic bag, thereby being disposable after a period of time, such as at least two days, at least four days, or at least 1 week, and may be). Alternatively, the upper layer (such as when composed of plastic) may be considered reusable, in which the upper layer is configured for washing with soap and water.

Further, as one example, the at least one middle layer may have less rigidity than the upper layer, such as little to no rigidity (e.g., flexible or floppy). In one or some embodiments, the at least one middle layer comprises a flexible bag that may be composed of at least party (or entirely) of plastic (e.g., polyethylene, such as LDPE, LLDPE, or the like), at least partly (or entirely) of oil-based fabric (e.g., vegetable oil), a plastic film, nonwoven fabric, woven fabric, or plastic textile. Thus, in one or some embodiments, the at least one middle layer may be at least partly oil and/or plastic-based (such as an oil and/or plastic-based coating or entirely composed of oil or plastic). Further, in one or some embodiments, the at least one layer may comprise tarpaulin (or tarp), which may comprise a strong, flexible, water-resistant or waterproof material, which may be composed of cloth, such as canvas or polyester coated with polyurethane or composed of plastics, such as polyethylene. Alternatively, the flexible bag may be cellulose-based (akin to the construction of the upper layer). In one or some embodiments, the flexible bag may be called single-use bags in which the bags are used a single time and then disposed. Alternatively, the at least one layer (e.g., tarp) may be reusable, and may be washed and/or wiped down in between uses. Further, in one or some embodiments, the flexible bag may have integrated therewith (such as heat sealed or placed on top of the bag) an odor absorbing layer, such as one or both of a bamboo fiber sheet, a charcoal fiber sheet, or a combination bamboo/charcoal fiber sheet. Moreover, in one or some embodiments, the at least one middle layer may be biodegradable or compostable. Still alternatively, or in addition, the at least one middle layer may comprise a bracing structure configured to provide support to the upper layer, as discussed in more detail below, which may, in one or some embodiments, have a greater rigidity than the upper layer (e.g., the upper layer composed of a cellulose-based material whereas the bracing structure comprises plastic or metal).

As still another example, the lower layer may comprise a rigid layer (e.g., more rigid than one or both of the upper layer and the at least one middle layer). In one or some embodiments, the lower layer is composed of rigid plastic, such as high-density polyethylene or other type of thermoplastic polymer. Alternatively, the lower layer may be composed of metal, such as steel. In either instance, the lower layer may be considered reusable, and may be washed with soap and water. Further, the rigidity of the lower layer may be greater than the rigidity of one or both the upper layer (e.g., when the upper layer is composed of a cellulose-based material) and the at least one middle layer. Alternatively, when the upper layer is composed of a more rigid material (e.g., plastic or metal), the upper layer may have the same (or similar) rigidity as the lower layer. Further, in one or some embodiments, the upper layer, which may be paper-based, may be more rigid than the at least one middle layer. Alternatively, or in addition, the at least one middle layer may be more rigid than the upper layer. Thus, in one or some embodiments, at least one of the middle layers may be less rigid than the upper layer (e.g., the bag) and at least one of the middle layers may be more rigid than the upper layer (e.g., the bracing structure). In this regard, in one or some embodiments, any one, any combination, or all of rigidity, stiffness, flexibility, or pliability of any one, any combination, or all of the upper layer, the one, some, or all middle layers, and the lower layer may different. Alternatively, any one, any combination, or all of rigidity, stiffness, flexibility, or pliability of any one, any combination, or all of the upper layer, the one, some, or all middle layers, and the lower layer may be the same. Further, the lower layer may include one or more holes, such as one or more holes in the sidewalls (such as holes in sidewalls positioned opposite one another) in order to act as air vents in order to vent the animal litter box.

Merely by way of example, rigidity of the different materials may be manifested in one of several ways. In one way, the necessary force applied to a respective layer in order to deform the respective layer may vary. In particular, in one or some embodiments, the at least one middle layer (which may be composed of flexible plastic akin to a garbage bag) may require less force in order for the at least one middle layer to deform than the force required to deform one or both of the upper layer or the lower layer. Alternatively, or in addition, the at least one middle layer (which may be composed of hard plastic or metal) may require more force in order for the at least one middle layer to deform than the force required to deform the upper layer. Further, the upper layer (which may be composed of a paper-based material) may require less force in order for the upper layer to deform than the force required to deform the lower layer (while still requiring more force than that required to deform the at least one middle layer).

Thus, in a first specific implementation, the main section comprises three layers, including a top layer, a middle layer, and a bottom layer. In a second specific implementation, the main section consists of the three layers. Alternatively, the main section may comprise (or consist of) any one, any combination, or all of: the clip structure(s); the upper layer; the bracing structure; the bag layer; or the lower layer. In one or some embodiments, any one, any combination, or all of the following may be detachable or removable from one another: the clip structure(s); the upper layer; the bracing structure; the bag layer; or the lower layer.

In one or some embodiments, the animal litter box may work in combination with and may be connected to a feeder. Alternatively, the animal litter box does not work with or is not connected to a feeder. The feeder may comprise a main section in which a container (e.g., a box) of hay may be inserted. In one or some embodiments, the main section may be formed as a rectangular-shaped box with a bottom and a plurality of sides, such as three or four sides. The fourth side of the main section (which may face the animal litter box) may be different from one or more of the remaining sides. As one example, the fourth side may comprise a removable grate. In particular, the fourth side may include one or more slots into which the removable grate may be slotted. As another example, the fourth side may only include a lip in order to hold a box of hay inserted therein.

In one or some embodiments, the feeder may be connected to the animal litter box in one of several ways. In one or some embodiments, the main section of the feeder may be connected (either directly or indirectly) to the lower layer of the animal litter box. For example, the lower layer may include a connecting structure that may mate with a part of the feeder (e.g., the main section of the feeder). In one or some embodiments, the connecting structure may be configured for reversible connection to the feeder (and vice-versa). In this way, the feeder and the animal litter box may be disconnected, such as for cleaning or the like, and may be reconnected for use by the rabbit. Alternatively, the connecting structure may be configured for an irreversible connection to the feeder (e.g., fused together or requiring special tools (e.g., unlike a typical reversible disconnection, which may be performed by hand) to reverse the connection).

Further, one or more side panels (alternatively termed spill guards) may be connected to only one or to both of the animal litter box or the feeder. Side panel(s) may be used in order to prevent food from the feeder or waste from the animal litter box from spreading in the surrounding area. In one or some embodiments, the side panel(s) are connected to the feeder, such as to the main section of the feeder. Alternatively, the side panel(s) are connected to the animal litter box.

Figure 1B:
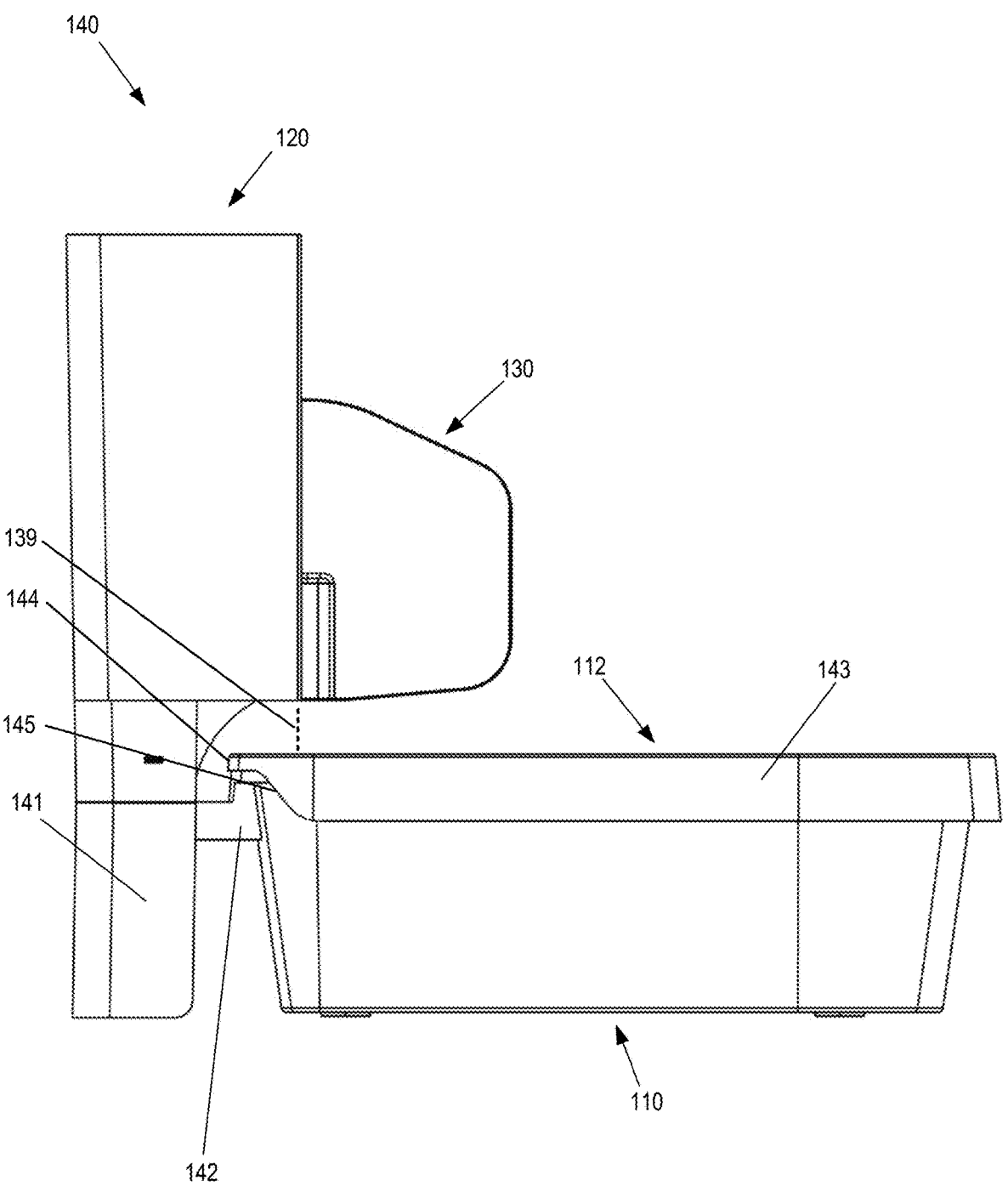
FIG. 1B is a left side view of the rabbit litter box and feeder section.
Figure 1C:
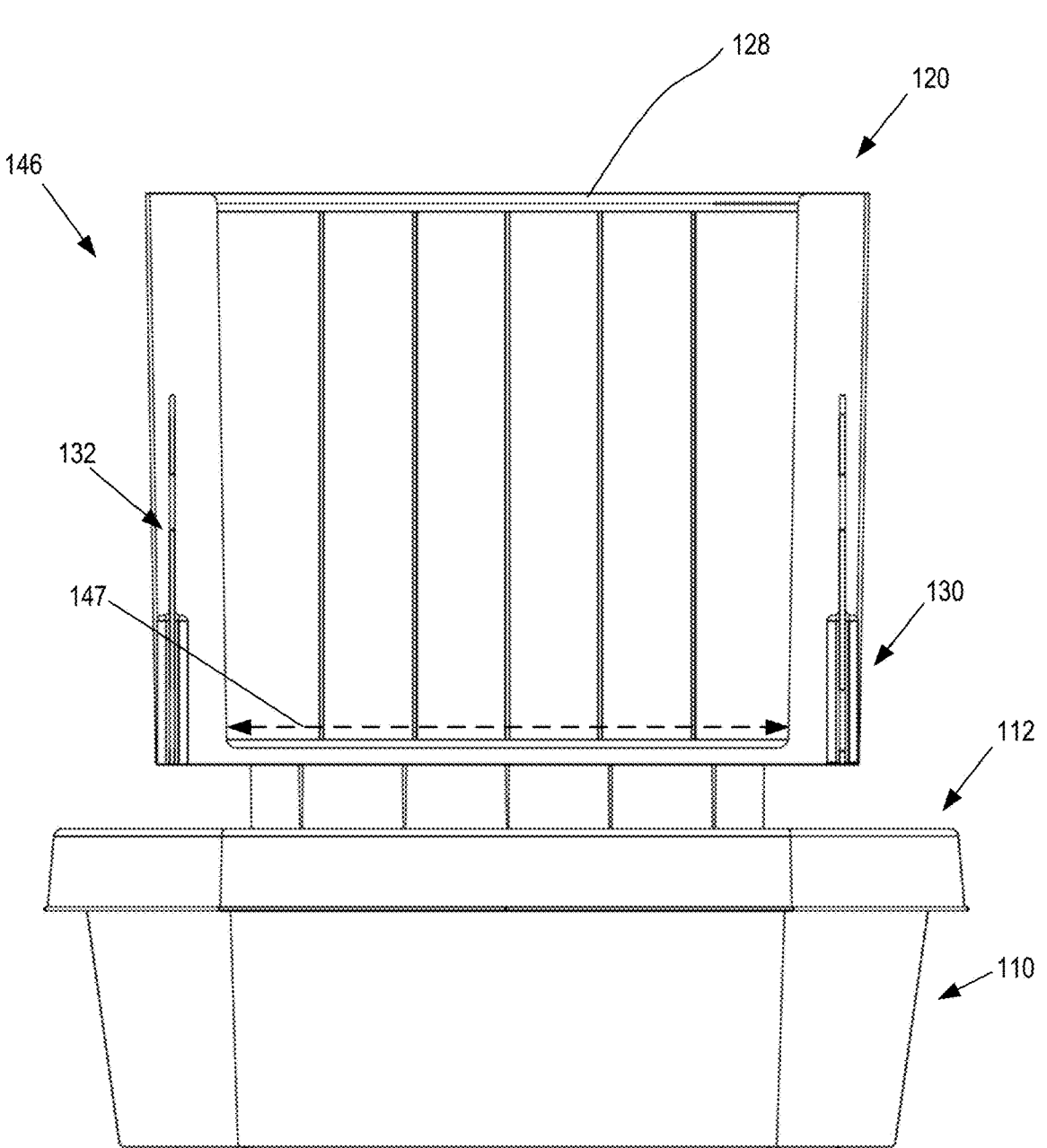
FIG. 1C is a front side view of the rabbit litter box and feeder section.

Referring to the figures, FIG. 1A is a front perspective view 100 of the rabbit litter box and feeder section (interchangeably termed feeder or rabbit feeder). FIG. 1B is a right side view 140 of the rabbit litter box and feeder section. FIG. 1C is a front side view 146 of the rabbit litter box and feeder section.

The following discussion is focused on a litter box/feeder combination for a rabbit. Other animals are contemplated, such as guinea pigs, or the like. The rabbit litter box may include any one, any combination, or all of: a lower layer 110 (interchangeably termed a lower section); one or more middle layers (interchangeably termed middle sections) (see FIGS. 4D-E); and an upper layer 112. In one or some embodiments, the lower layer 110 may be composed of plastic (or other type of plastic-based material) or a metallic-based material. In one or some embodiments, the upper layer 112, which may be shaped to seat into the lower layer 110, may be composed of a less rigid material than of the upper layer 112, such as a cellulose-based or paper-based material. In this way, rabbits that may gnaw at the upper layer 112 need not ingest anything damaging. Upper layer 112 may be shaped such that a cavity 114 is formed therein, into which a rabbit may sit. Further, upper layer 112 may include a plurality of holes 116 that are shaped, as discussed in more detail below.

The feeder section 120 may be composed of a main section, which may be multi-sided, such as sides 121, 122, 123, 124, 125, and a bottom 126. As discussed in more detail below, sides 124, 125 may include slots (see 176 in FIG. 1F) into which grate 128 (alternatively term grille) may slide. In this way, grate 128 may be reversibly attached or connected to a part of the feeder section 120 and may be removed from feeder section 120.

Further, FIG. 1A illustrates side panels 130, 132, which may connect with a part of the feeder section 120, such as with connectors 134, 136 on sides 124, 125 (interchangeably termed walls).

Figure 1D:
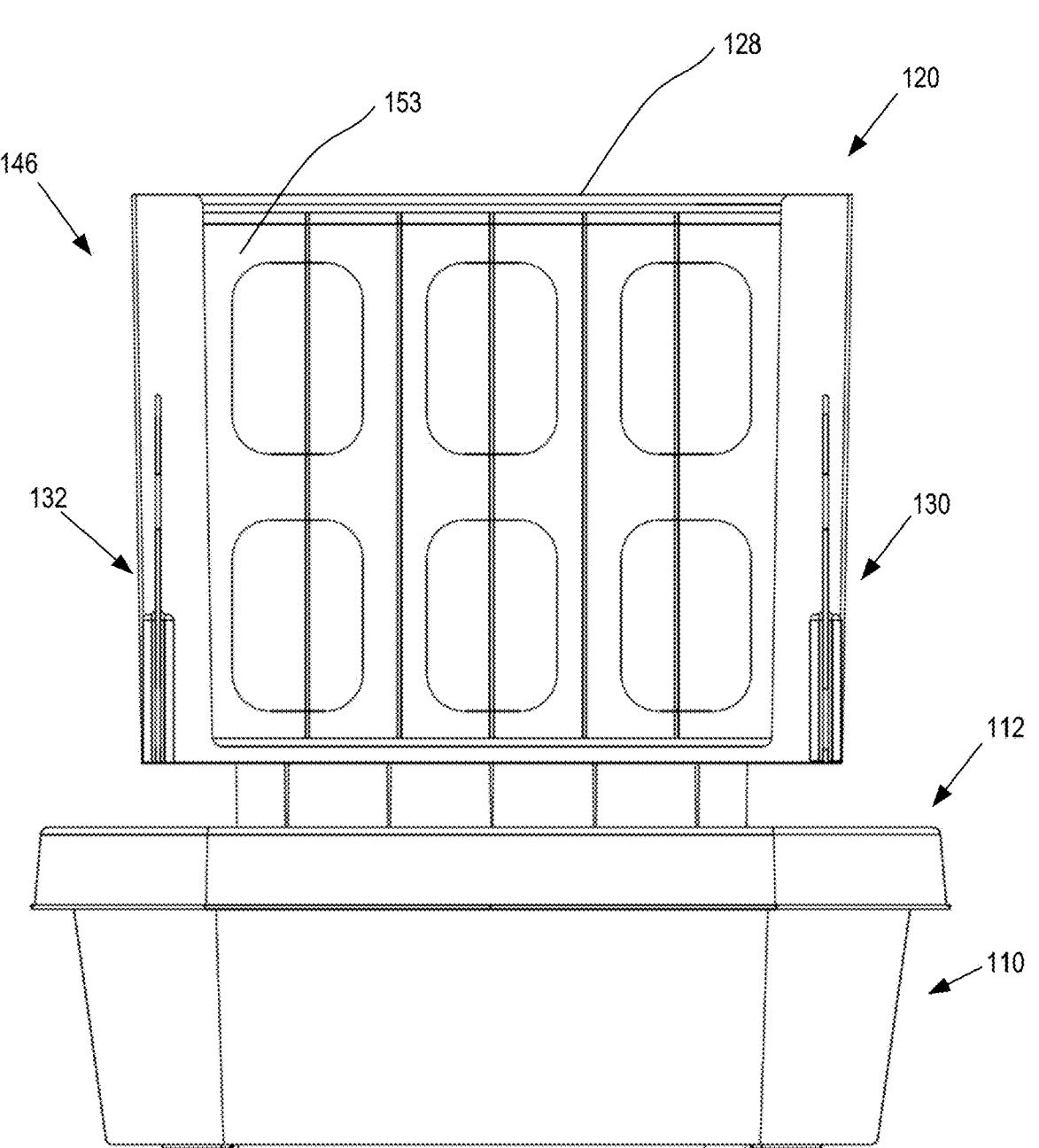
FIG. 1D is a front side view of the rabbit litter box and feeder section, including a box of hay in the feeder section.

As discussed above, hay may be put into the cavity formed by sides 121, 122, 123, 124, 125 and bottom 126. In one or some embodiments, a box 153 of hay, shown in the front side view 152 of FIG. 1D, may be inserted into the cavity. Alternatively, hay may be placed directly within cavity and may be held by grate 128.

As shown in FIG. 1B, main section of the feeder section 120 may be supported by support structure 141. In one or some embodiments, supporting structure 141 and connecting bracket 142 may be part of lower layer 110. For example, a single piece of molded plastic may be formed so that lower layer 110 comprises supporting structure 141 and connecting bracket 142. Alternatively, supporting structure 141 may comprise a piece separate from the lower layer 110 and may be connected to lower layer 110 via connecting bracket 142. As illustrated in more detail below, supporting structure 141 may be connected to the lower layer via a plurality of connecting brackets 142.

Further, as shown in FIG. 1B, the feeder section 120 is positioned relative to the upper layer 112 so that a forward part of the feeder section 120 is over the cavity 114 formed in the upper layer 112. This is shown by line 139. In this when, when the bunny, sitting in the cavity 114, is eating hay from the feeder section 120, any excess hay drops directly downward into the cavity 114 (as opposed to outside of the upper layer 112), thereby reducing the mess in the surrounding area. Further, as discussed in more detail below, the positioning the feeder section 120 (being pushed forward over the cavity 114) may work in combination with the side panels 130, 132 to further confine the hay to fall within the cavity of upper layer 112, as discussed in more detail below.

FIG. 1B further illustrates that upper layer 112 may include a lip on one or more sides, such as illustrated by 143, 144. As shown, the side 144 closer to feeder section 120 (and positioned underneath feeder section 120) is shorter than side 143 further away from feeder section 120. In one embodiment, side 143 may include a curvature 145 to transition to side 144. In this way, when a person wishes to lift up or remove upper layer 112, the person may insert his/her fingers underneath feeder section 120, wrap the fingers around side 144 (which is shorter than side 143), thereby making it easier to remove upper layer 112. Further, in one or some embodiments, with side 144 being shorter than side 143, when bag 900 is installed, fewer than all of the overhang of the bag 900 are covered by the sides 143, 144 of upper layer 112. For example, side 144 (being shorter) may not entirely cover the overhang of bag 900 underneath the feeder section 120 whereas the other 3 sides of the upper layer 112 (including side 143) may entirely cover the overhang of bag 900. One may be concerned that because side 144 does not entirely cover the overhand of bag 900 that the bunny may nibble on the exposed overhang of the bag 900. However, because the feeder section 120 is pushed forward, the bunny may not be able to reach behind to chew on exposed overhang of the bag 900.

Further, as shown in FIG. 1C, the width of the opening (as shown by line 147 between sides 124, 125) of feeder section 120 may be narrower than the width of the cavity 114 (as shown by line 148 in FIG. 1A). In this way, errant hay that drops from the feeder section 120 may fall into the cavity 114 of upper layer 112 rather than outside of the device. Moreover, the side width of the opening of the feeder section 120 may work in combination with side panels 130, 132 to further guide the errant hay into the cavity 114.

Figure 1E:
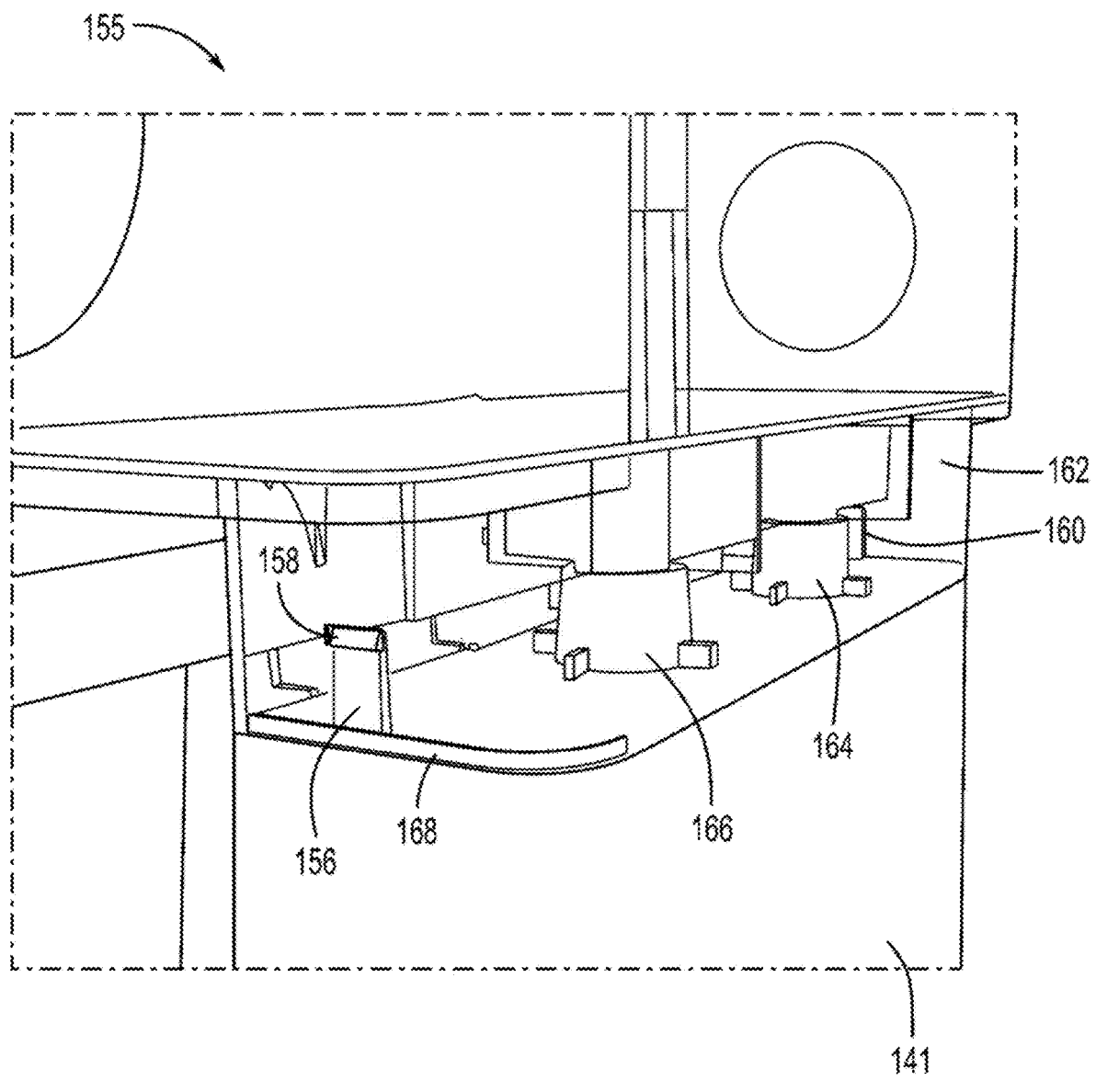
FIG. 1E is a back perspective view of a portion of the rabbit litter box and feeder section.

As discussed above, the rabbit litter box and feeder section may be reversibly connected to one another. FIG. 1E is an example of the connection, illustrating a back perspective view 155 of a portion of the rabbit litter box and feeder section. As shown, supporting structure 141 may perform one or more functions for the feeder section including one or both of supporting the feeder section or connecting to the feeder section. For example, supporting structure 141 may include one or more structures to support and/or connect to the feeder section. The one or more structures may include any one, any combination, or all of: tabs 156, 160; slots 164, 166; or lip 168. For example, tabs 156, 160 (interchangeably termed clips) may include a detent 158, a catch, or a lever that may mate with a part of the feeder section, such as lower portion 162 of the feeder section. Further, the lower portion 162 of feeder section may include protrusions (interchangeably termed cylinders, see 764, 766 in FIGS. 7B-C) which may mate with slots 164, 166, which may in turn lock the feeder section laterally and/or vertically. Moreover, lower portion 162 may further include a rim that mates or abuts with lip 168 in order to lock the feeder section laterally.

Figure 1F:
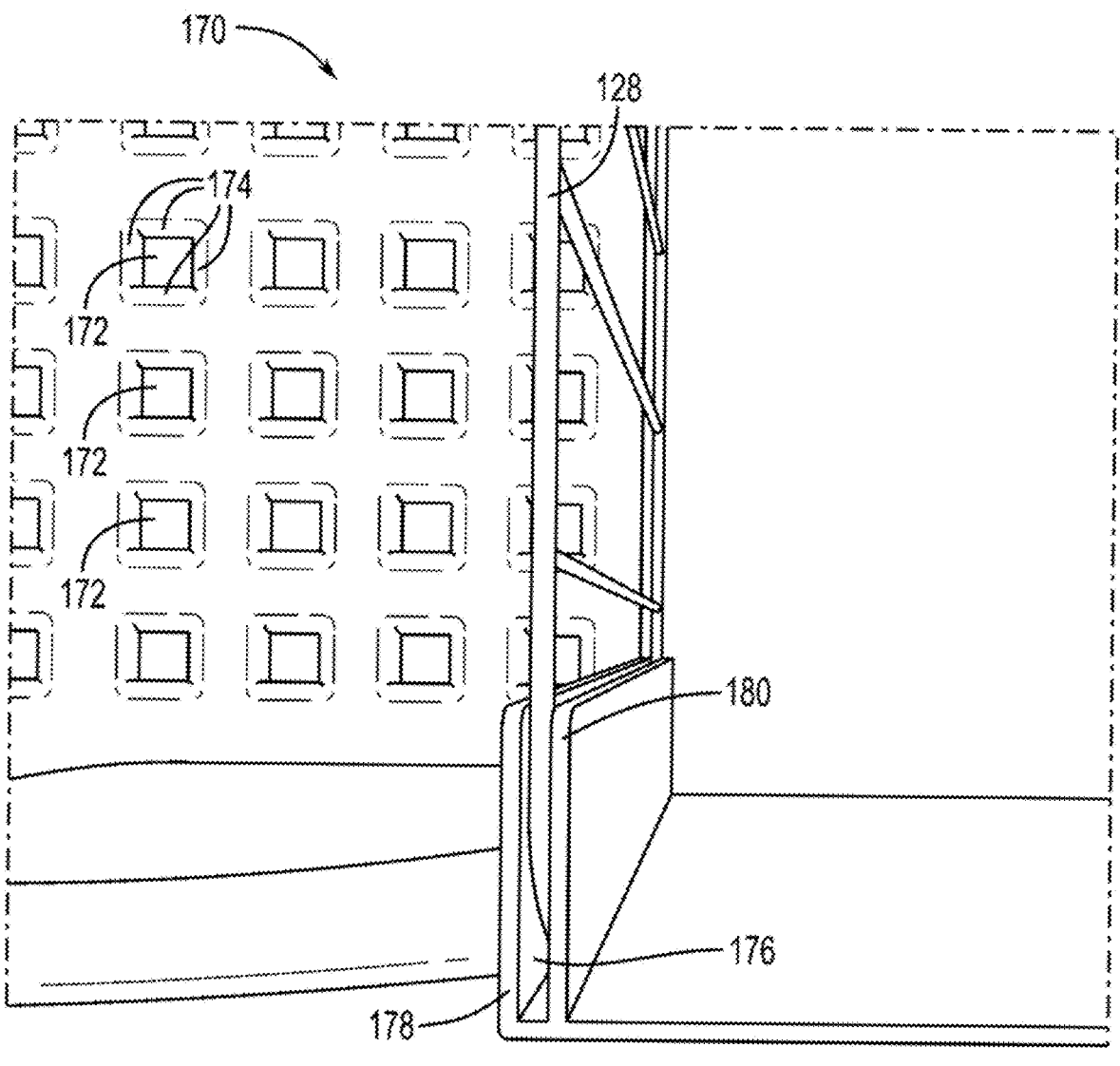
FIG. 1F is a top view of a portion of the rabbit litter box and feeder section.

As discussed above, grate 128 may be slotted into the main section of the feeder section 120, as shown in the top view 170 of the rabbit litter box and feeder section FIG. 1F.

One or both of sides 124, 125 may include multiple surfaces 178, 180, which may form a slot 176 therebetween. In this way, grate 128 may be slid into slot 175 in order to hold grate 128 in place. Details of the upper layer 112 are discussed below with regard to FIG. 2C.

Figure 1G:
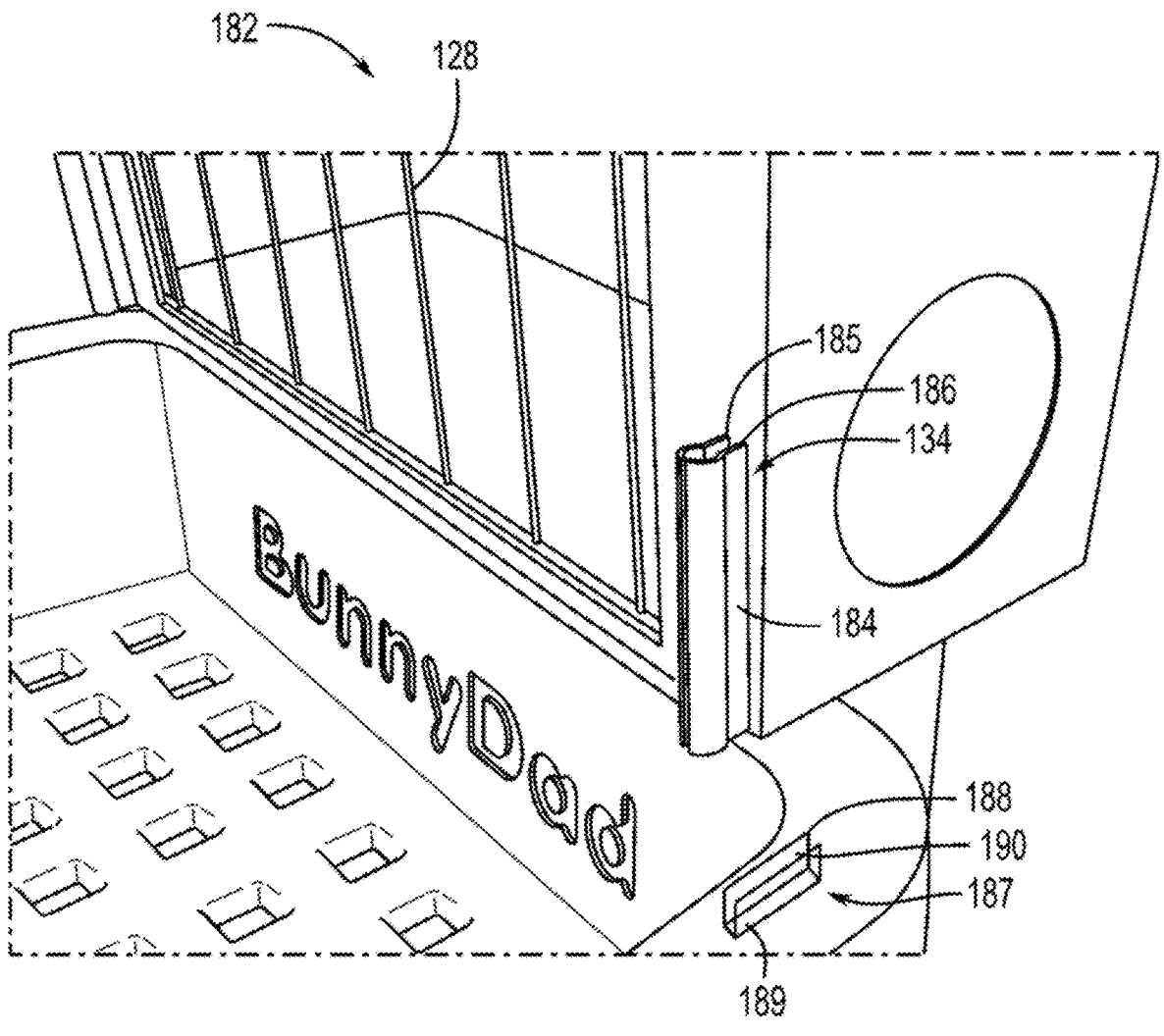
FIG. 1G is a right perspective view of a portion of the rabbit litter box and feeder section without the side panel.

As discussed above, side panels 130, 132 may be connected to at least a part of feeder section, such as to sides 124, 125 via connectors 134, 136. FIG. 1G is a right perspective view 182 of a portion of the rabbit litter box and feeder section without the side panels, highlighting specifics of connectors 134, 136. As shown, connector 134 (which may apply as well to connector 136) includes sides 184, 185 shaped so that a predetermined cross section or predetermined volume 186 may be formed therebetween. As shown in FIG. 1G, the predetermined volume 186 is column-like in shape with a circular cross section. Other cross sections or volumes are contemplated.

Figure 1H:
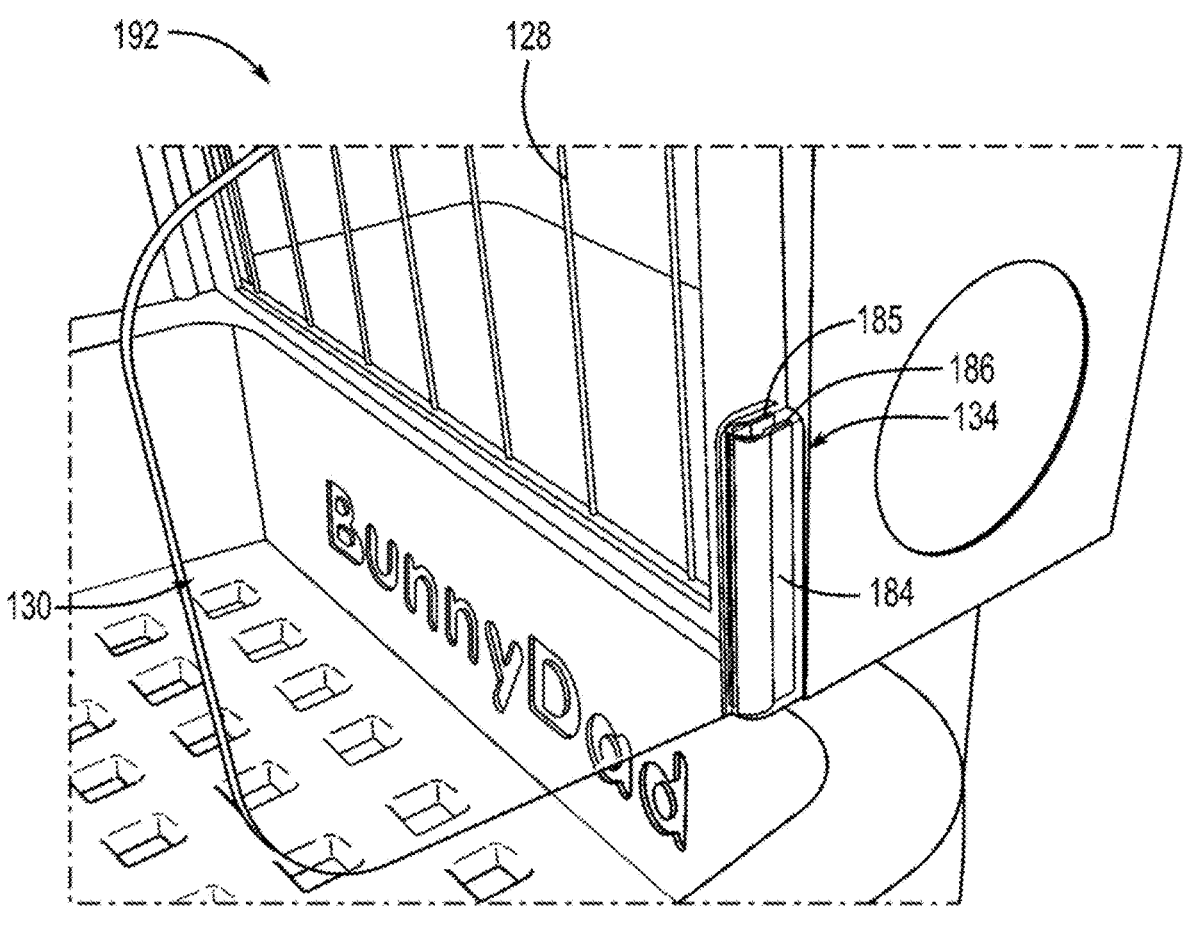
FIG. 1H is a right perspective view of a portion of the rabbit litter box and feeder section with the side panel.

In practice, the side panels 130, 132 may mate with the predetermined cross section or predetermined volume 186 and be held therein. This is illustrated in the right perspective view 192 in FIG. 1H.

Alternatively, or in addition, the side panels 130, 132 may be connected to a part of the rabbit litter box (e.g., to the lower layer 110 or to the upper layer 112). As one example, connector 187 may be connected to upper layer 112, with connector 187 having sidewalls 188, 189 to form channel 190 therebetween, into which side panel 130 may be slotted and held therein.

Figure 2A:
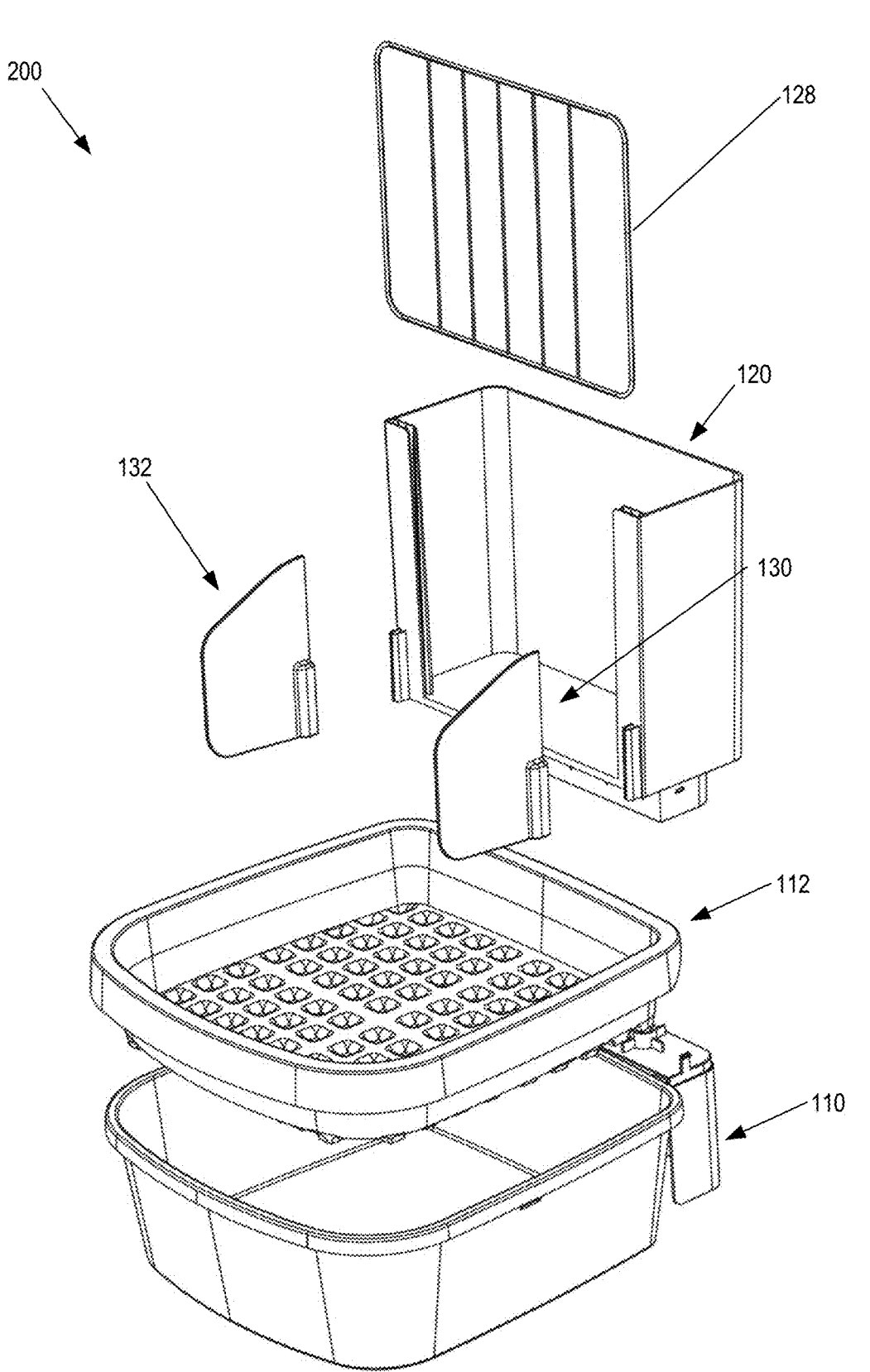
FIG. 2A is a front perspective exploded view of different parts of the rabbit litter box and different parts of the feeder section.

FIG. 2A is an exploded view 200 of the rabbit litter box and feeder section. As discussed above, various pieces of the rabbit litter box and/or feeder section may be connected, removed, and reconnected, such as for cleaning. For example, any one, any combination, or all of the grate 128, side panels 130, 132, upper layer 112, lower layer 110, or main section may be connected and reconnected as shown.

Figure 2B:
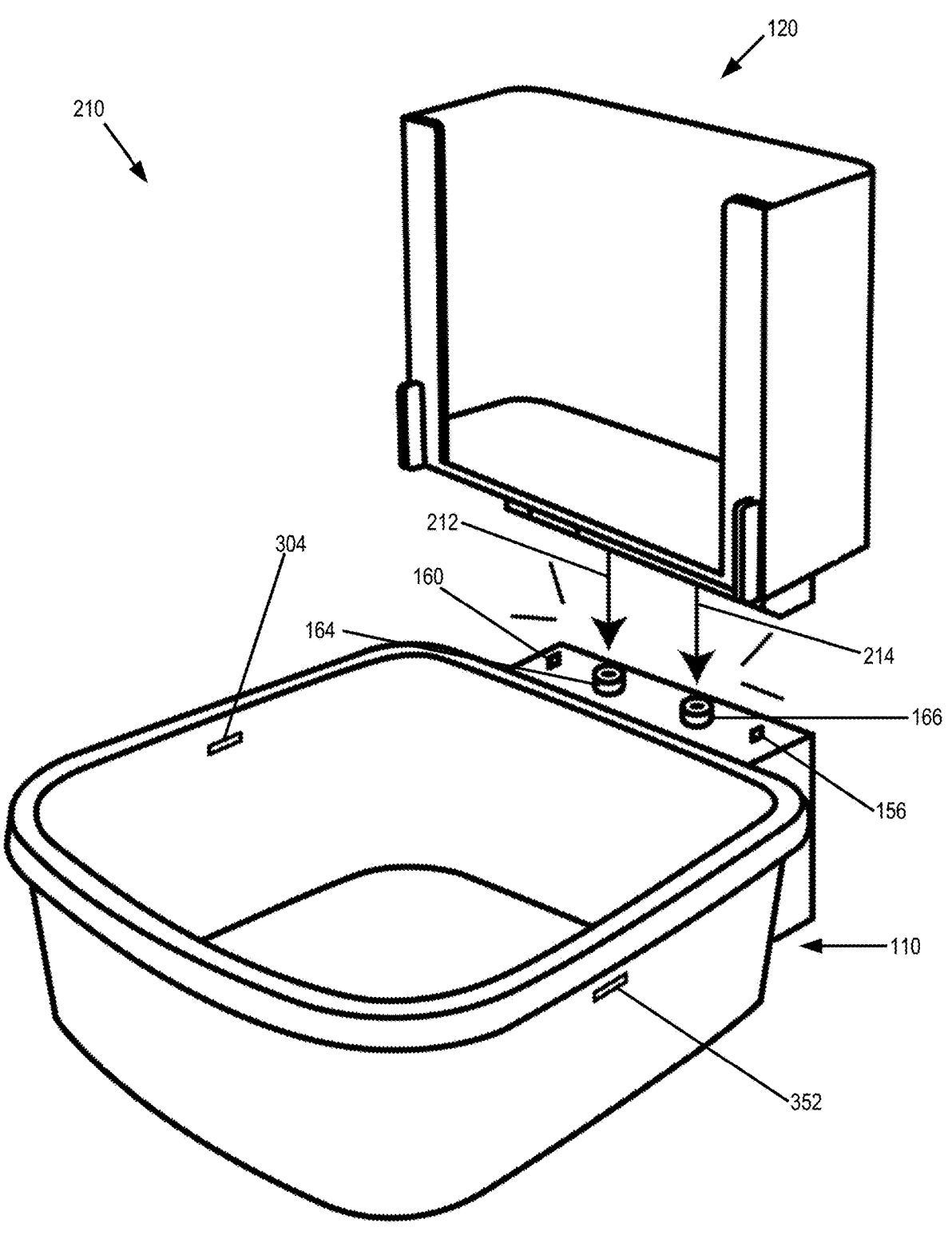
FIG. 2B is a front perspective exploded view of the rabbit litter box and feeder section.
Figure 2C:
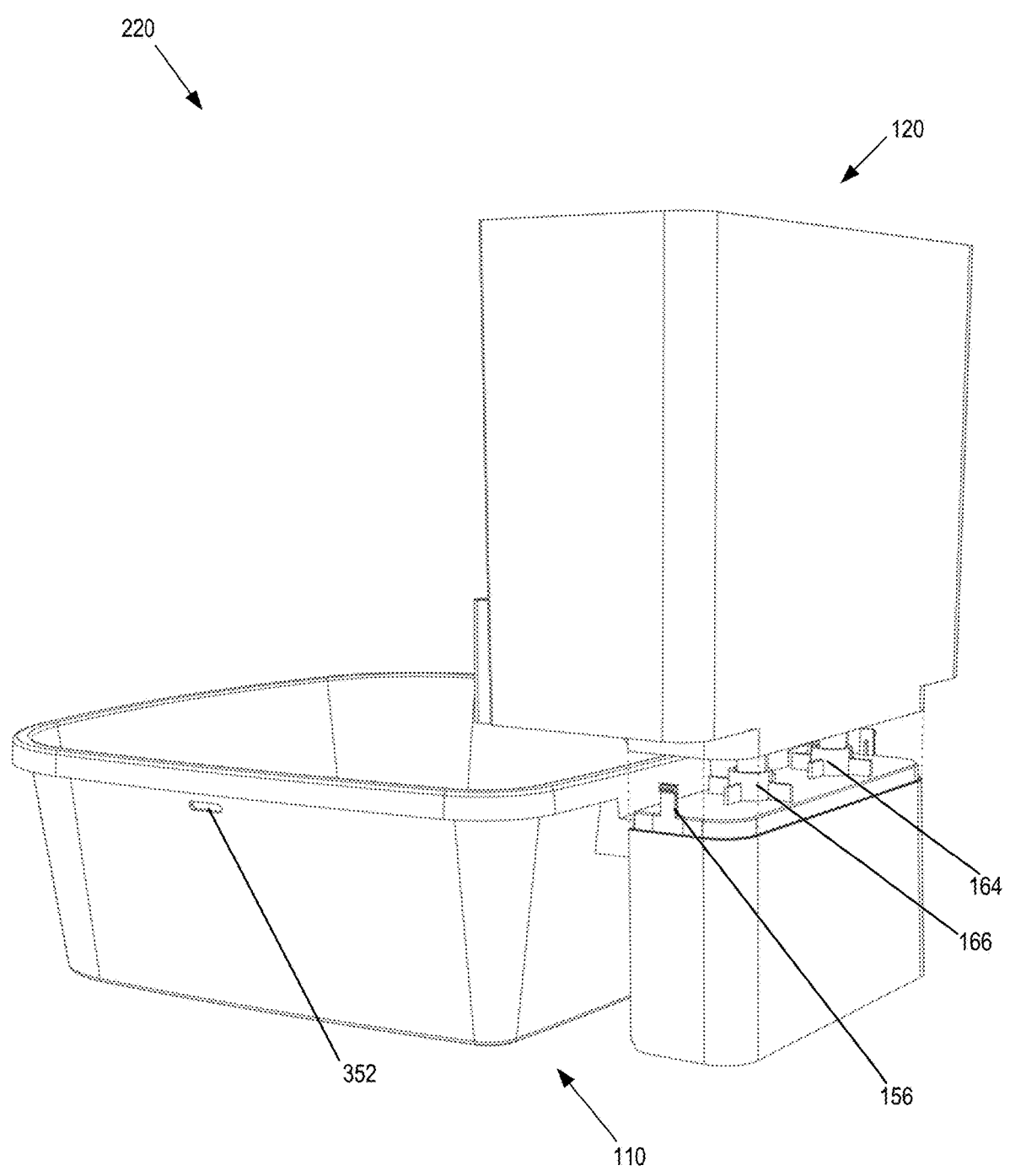
FIG. 2C is a rear perspective exploded view of the rabbit litter box and feeder section.

FIG. 2B is a front perspective exploded view 210 of the lower layer 110 of the rabbit litter box and feeder section 120 in order to connect the rabbit litter box to the feeder section 120. FIG. 2C is a rear perspective exploded view 220 of the lower layer 110 of the rabbit litter box and feeder section 120. As shown in FIG. 2B, arrows 212, 214 illustrate how feeder section 120 is connected to lower layer 110 by connecting to tabs 156, 160 and slots 164, 166.

Figure 2D:
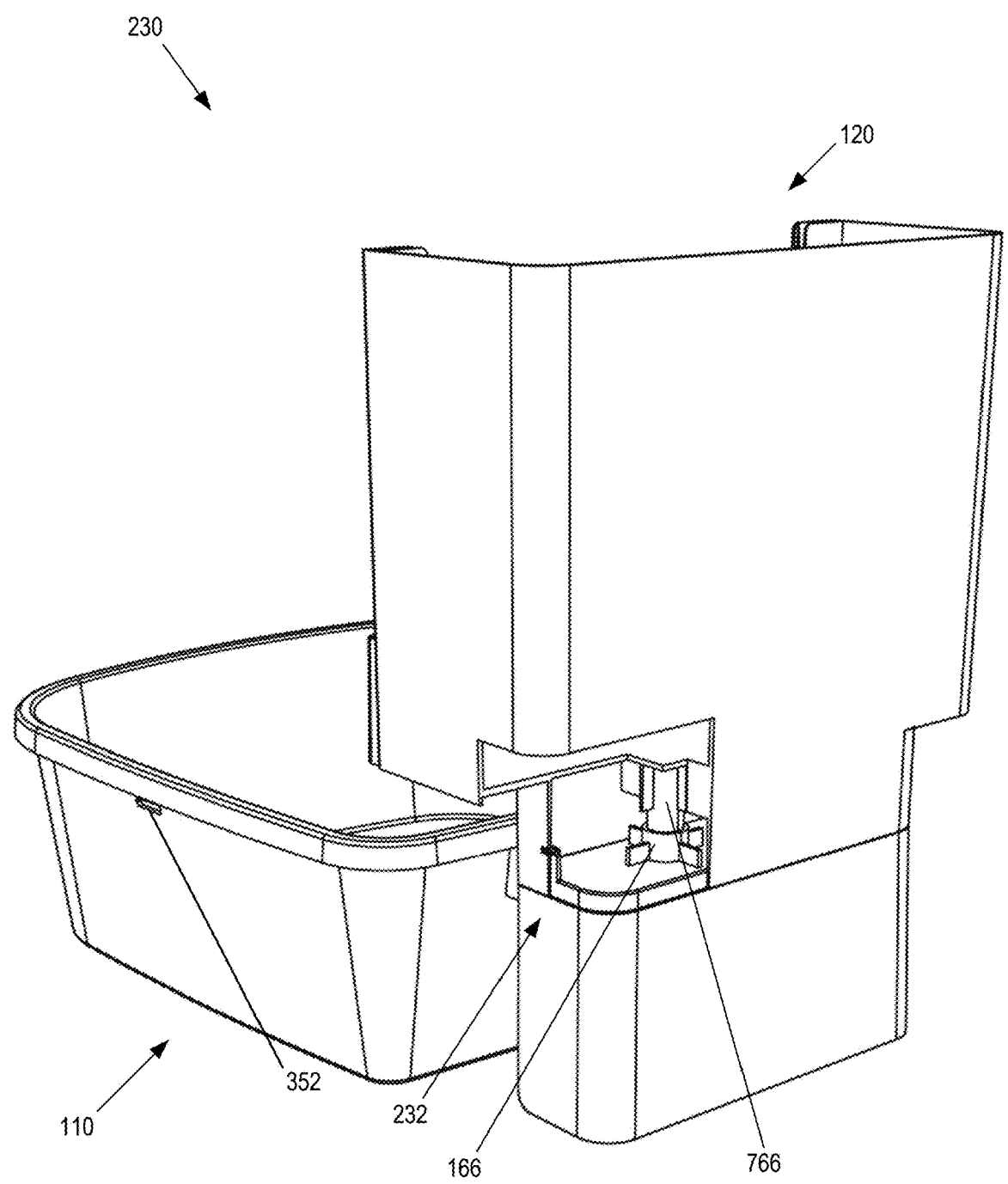
FIG. 2D is a rear perspective view of the rabbit litter box and the feeder section connected together with a cutaway showing part of the connection of the feeder section to the rabbit litter box.

FIG. 2D is a rear perspective view 230 of the lower layer 110 of the rabbit litter box and the feeder section 120 connected together with a cutaway 232 showing part of the connection of the feeder section 120 of the lower layer 110 of the rabbit litter box.

Figure 2E:
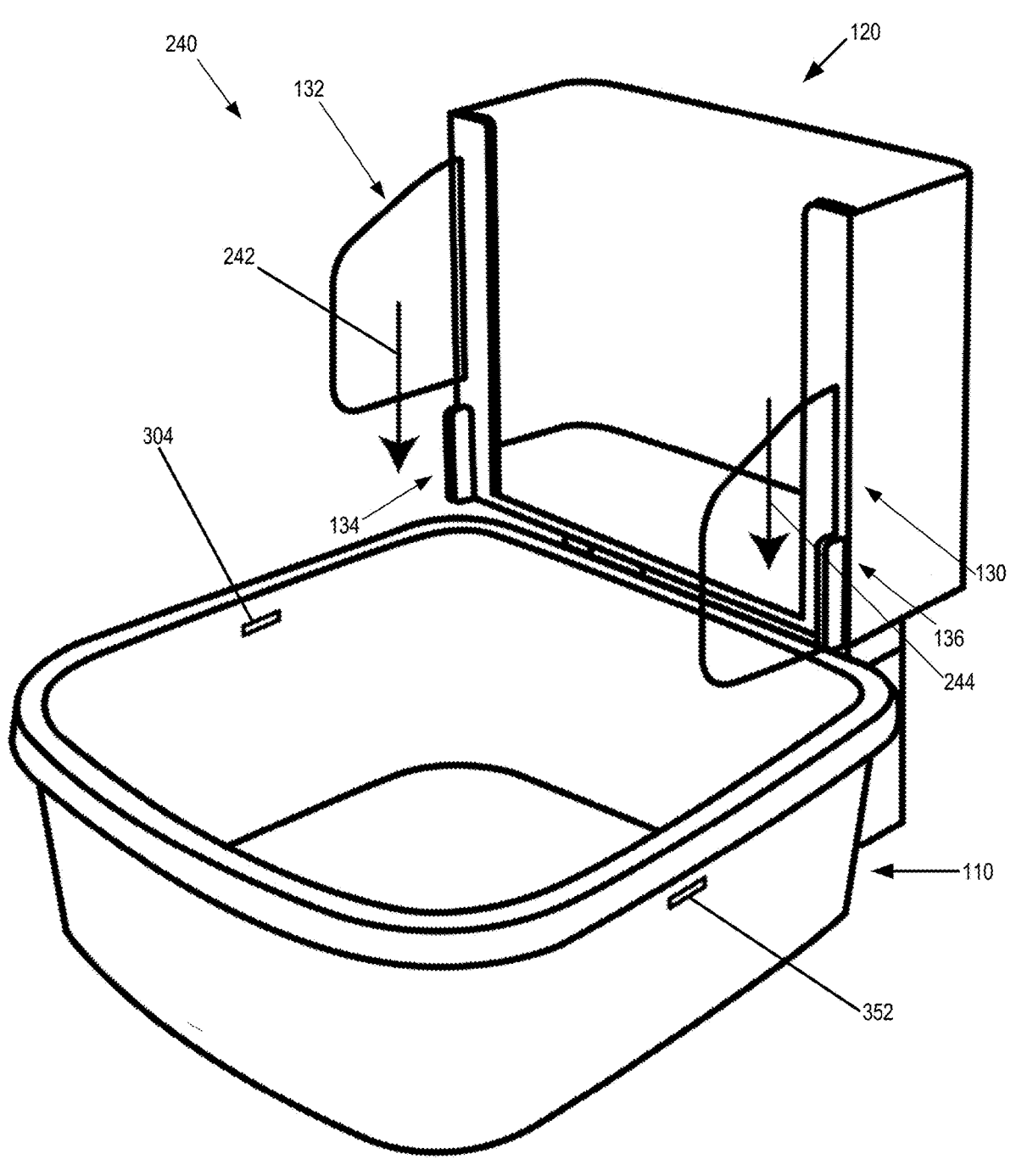
FIG. 2E is a front perspective view of the lower layer of the rabbit litter box connected to part of the feeder section.

FIG. 2E is a front perspective view 240 of the lower layer 110 of the rabbit litter box connected to part of the feeder section 120, and further illustrates side panels 130, 132 being slid into connectors 134, 136, as shown by arrows 242, 244.

Figure 2F:
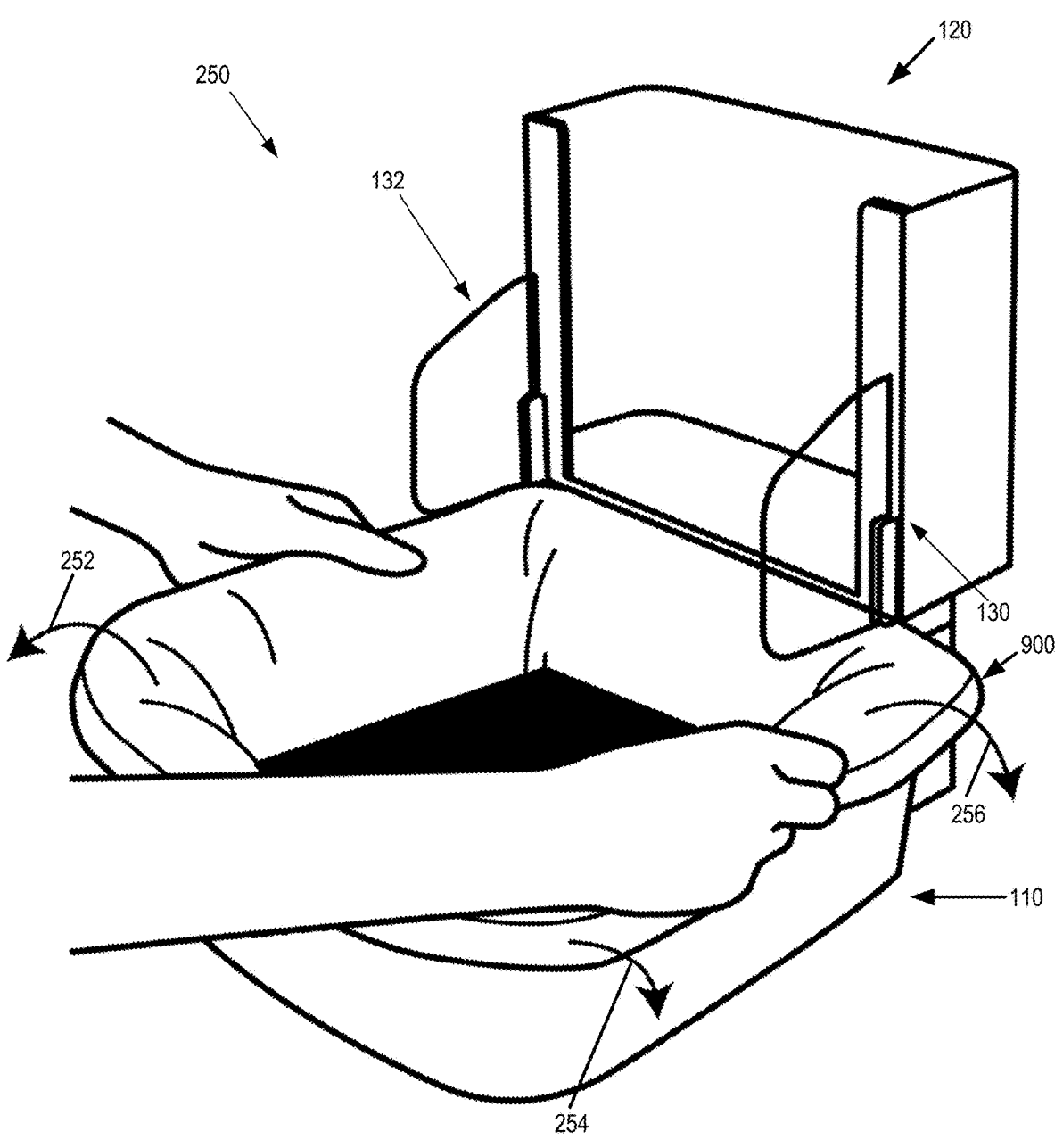
FIG. 2F is a front perspective view of the bag being placed on the lower layer of the rabbit litter box that is connected to part of the feeder section.

FIG. 2F is a front perspective view 250 of the bag (an example of which is bag 900, discussed further below) being placed on the lower layer 110 of the rabbit litter box that is connected to part of the feeder section 120. As shown, bag 900 may be draped over lower layer 110 as shown by arrows 252, 254, 256.

Figure 2G:
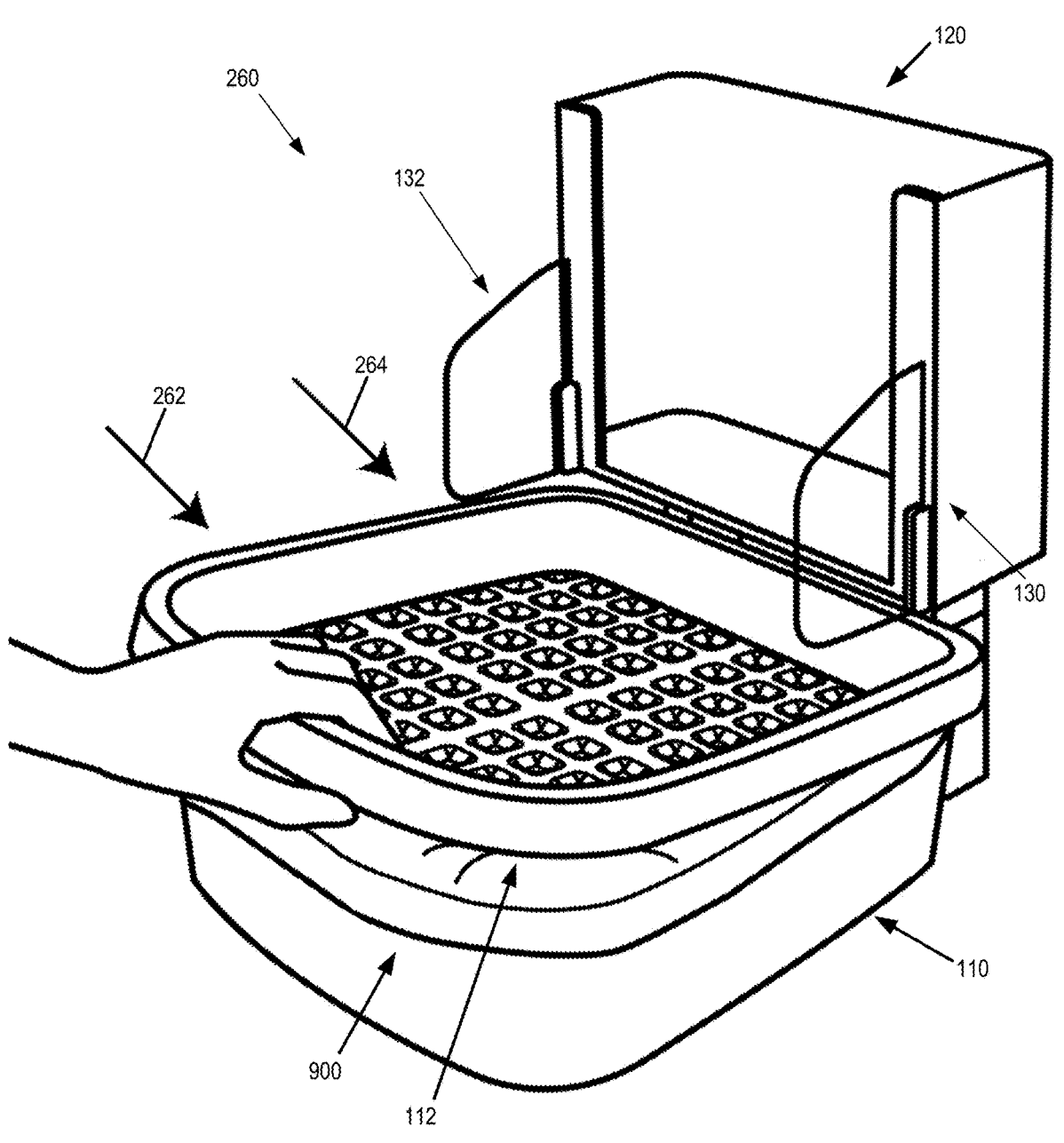
FIG. 2G is a front perspective view of the paper tray being placed on top of the bag and the lower layer of the rabbit litter box, which is connected to part of the feeder section.

FIG. 2G is a front perspective view 260 of the upper layer 112 (which may comprise a paper tray) being placed on top of the bag 900 and the lower layer 110 of the rabbit litter box, which is connected to part of the feeder section 120. For example, the upper layer 112 may be placed on top (with only gravity holding the upper layer 112 in place to the bag 900), as shown by arrows 262, 264.

Figure 2H:
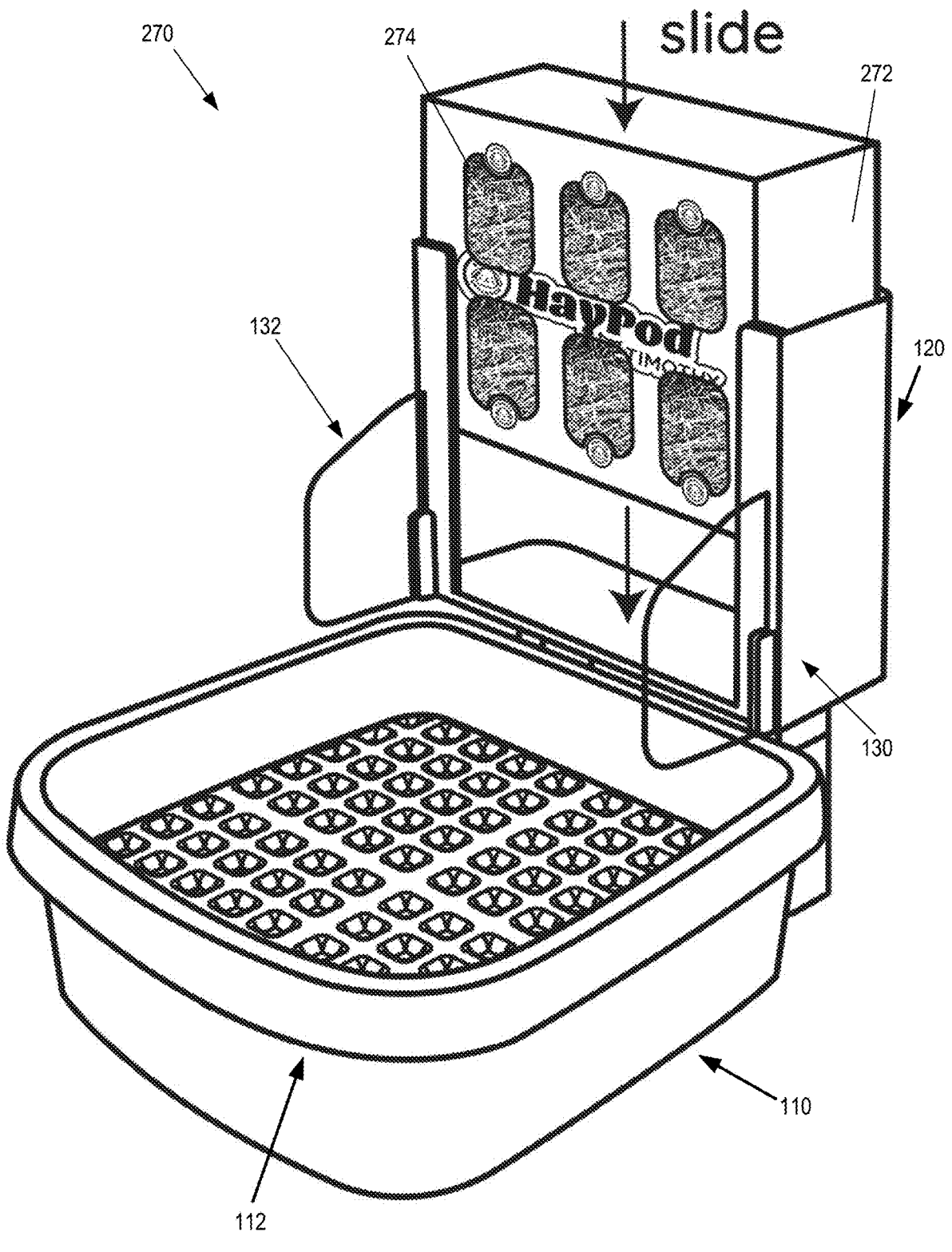
FIG. 2H is a front perspective view of a box of hay being inserted into the feeder section.

FIG. 2H is a front perspective view 270 of a box 272 of hay being inserted into the feeder section 120. As shown, grate 128 may be removed prior to inserting the box 272 of hay. So that box 272, which may include a plurality of openings 274, may hold the hay within the box 272.

Figure 2I:
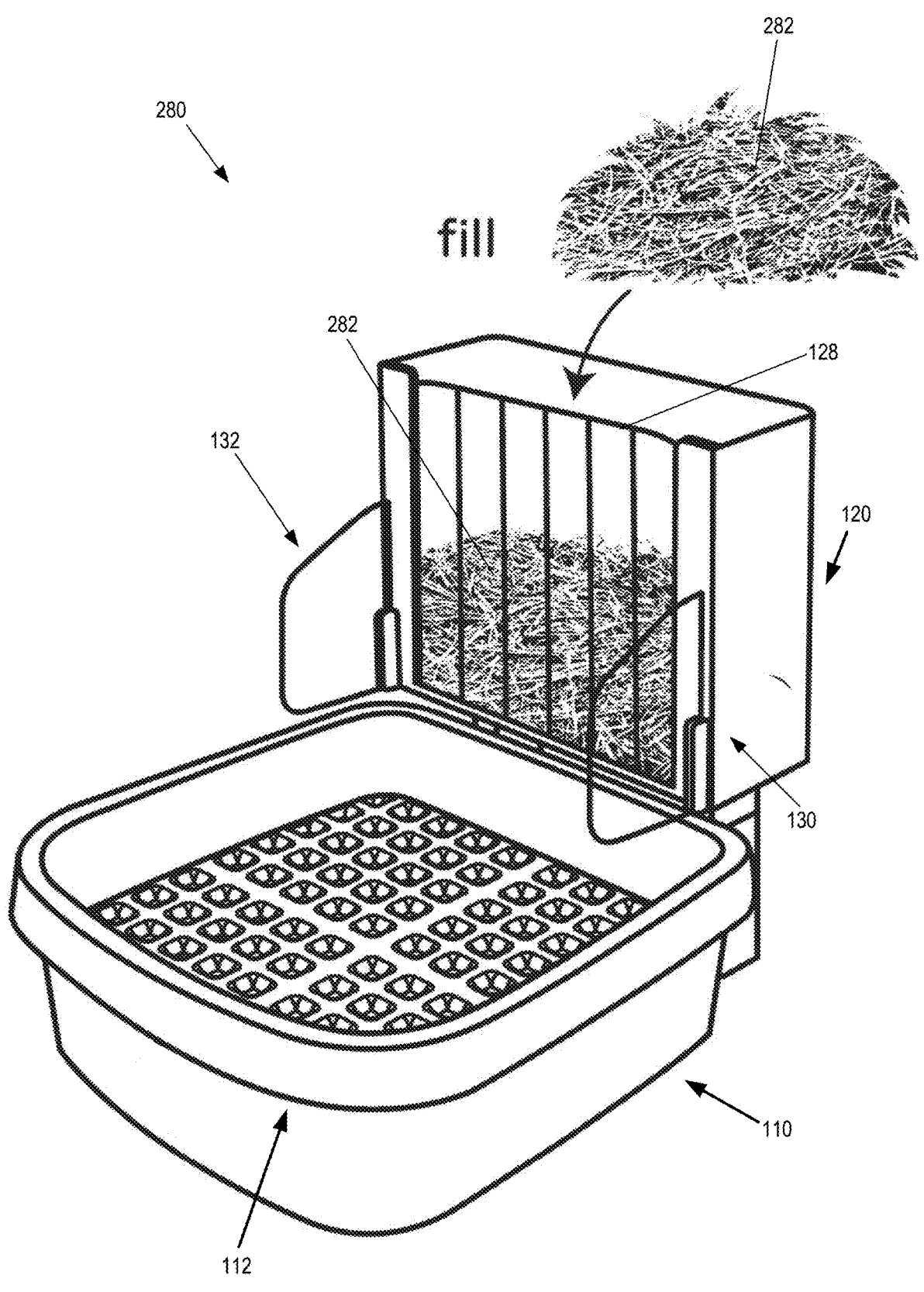
FIG. 2I is a front perspective view of loose hay being inserted into the feeder section.

FIG. 2I is a front perspective view 280 of loose hay 282 being inserted into the feeder section 120, and may be held therein using grate 128. Thus, in one or some embodiments, the side panels 130, 132 may be reversibly connected to the at least one of the feeder section 120, the upper layer 112, or the lower layer 110 such that when connected, the plurality of side panels are connected, the plurality of side panels are proximate to the upper layer and frame a side of the upper layer and frame opposite ends of the opening of the feeder section 120 so that hay taken from the feeder section 120 is limited from spilling outside of the feeder section 120 and may spill onto the upper layer 112.

Figure 2J:
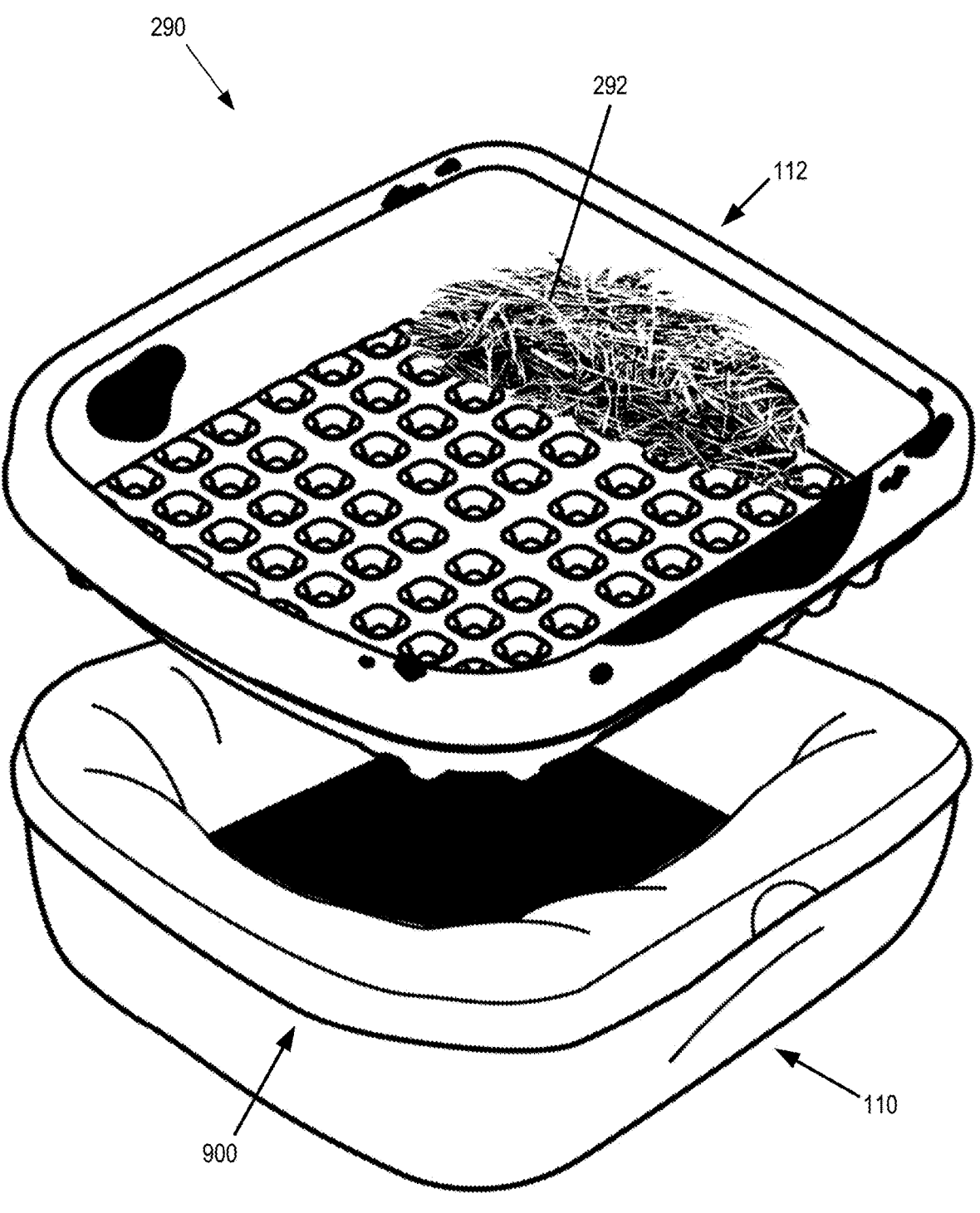
FIG. 2J is a front perspective view of removing the paper tray, which may have waste or hay, from the bag and the lower layer of the rabbit litter box.

FIG. 2J is a front perspective view 290 of removing the upper layer 112 (which may comprise a paper tray), which may have waste or hay 292, from the bag and the lower layer of the rabbit litter box. For example, periodically, such as daily, the paper tray may be removed (e.g., lifted up), with its contents then dumped into a garbage can. After removal of the paper tray, the bag may be changed. After which, the paper tray, after its waste/hay is removed, may be placed on top of the newly-installed bag. In this regard, the paper tray may be used for longer than the bag.

Figure 3A:
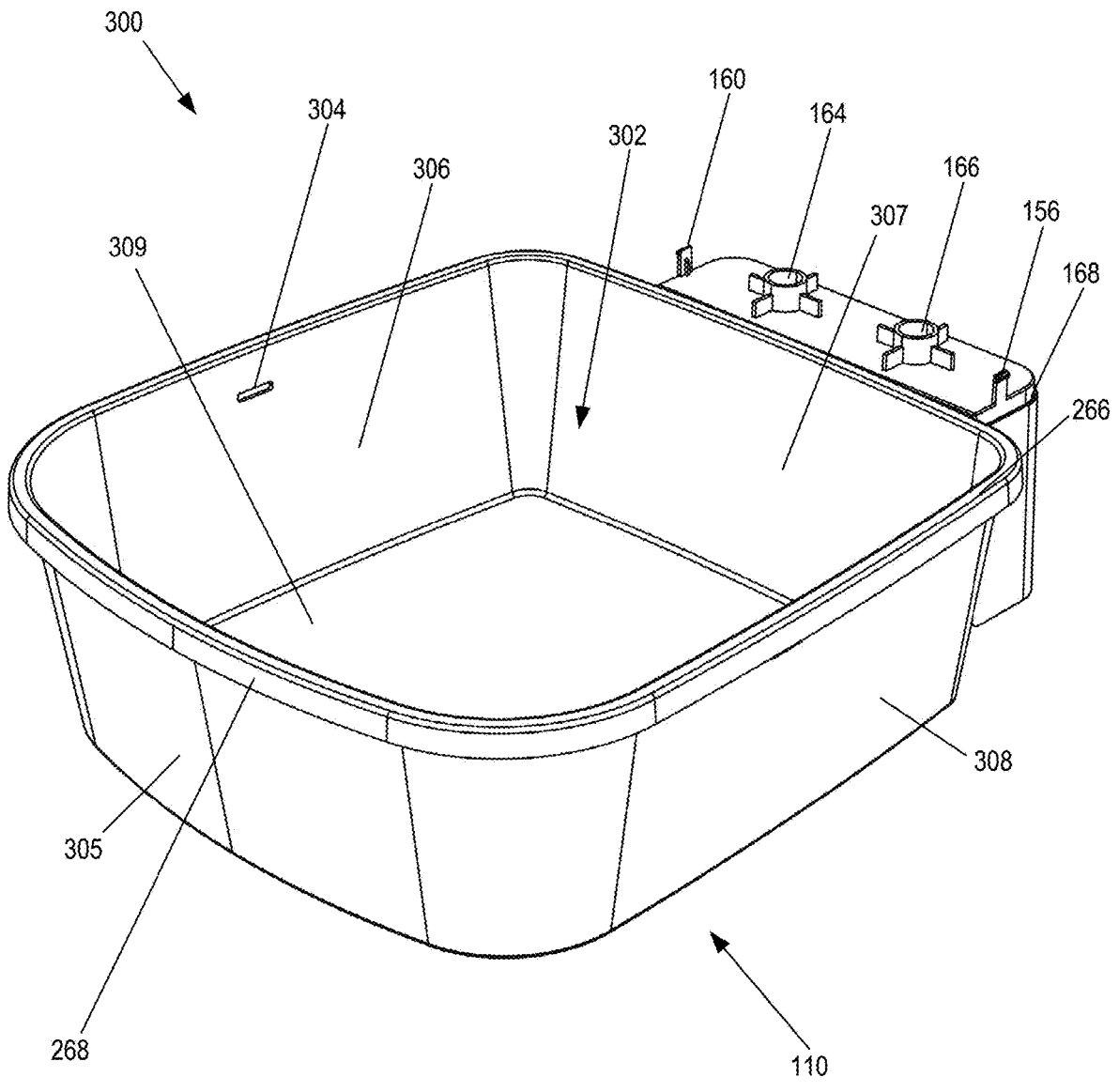
FIG. 3A is a front perspective view of the rigid bottom section.
Figure 3B:
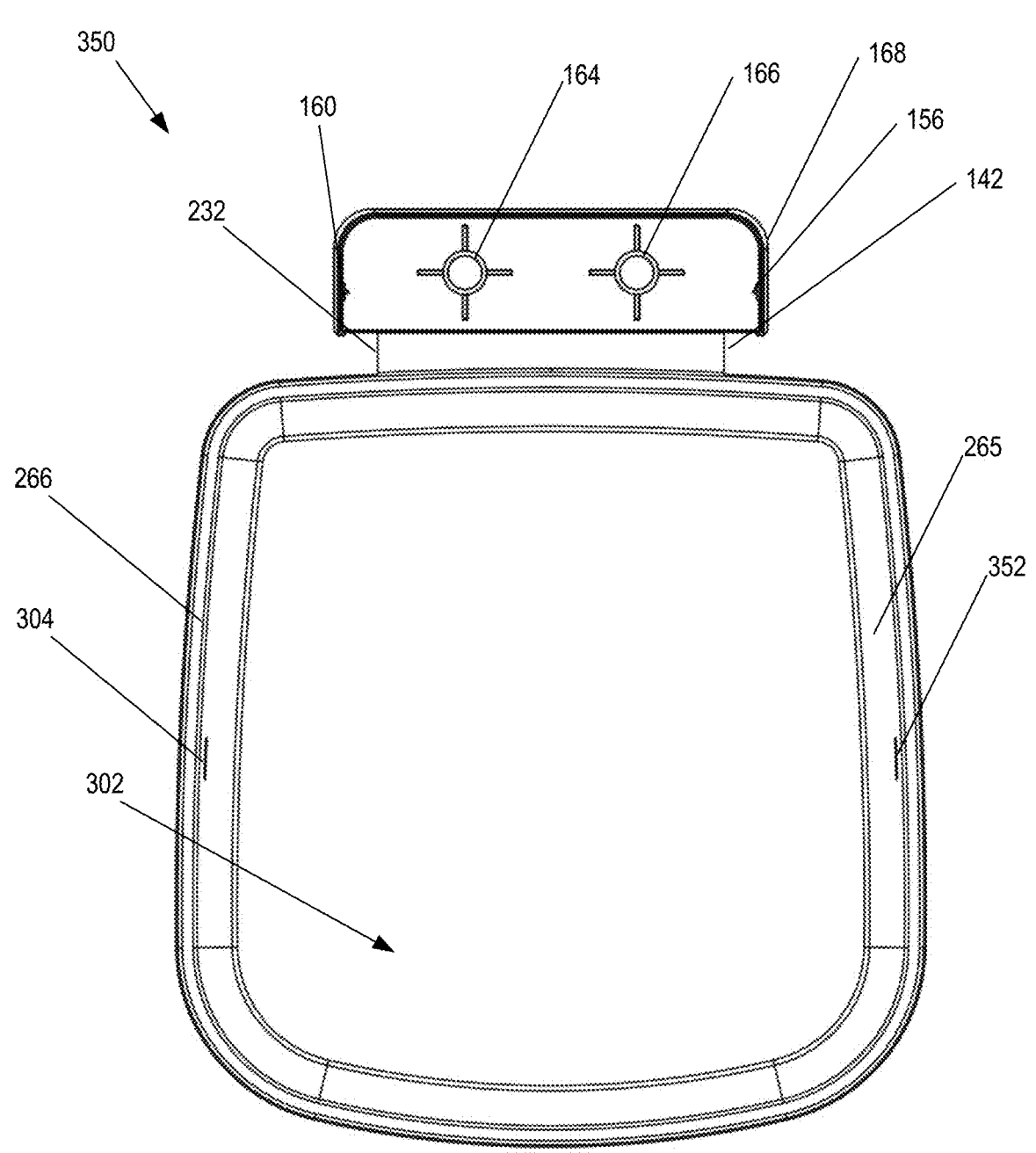
FIG. 3B is a top view of the rigid bottom section.

FIG. 3A is a front perspective view 300 of the lower layer 110, which may comprise a rigid bottom section. FIG. 3B is a top view 350 of the lower layer 110. As shown, lower layer 110 may include a top surface, which may comprise side 266, and an overhang, which may comprise side 268. Further, lower layer 110 may include a main section that forms a cavity 302 therein surrounded by one or more walls 265, and may further include a support section upon which feeder section 120 may be supported. In one or some embodiments, lower layer 110 may include one or more holes (hole 304 is illustrated in FIG. 3A, holes 304, 352 are illustrated in FIG. 3B). In one or some embodiments, the one or more holes may be on one or more sides of lower layer 110, such as on opposite sides 306, 308 of lower layer 110 or on each of the sides of lower layer 110. Alternatively, or in addition, holes may be on sides 305, 307. Further, in one or some embodiments, the hole(s) may be positioned in the upper half of the respective side, such as less than 30%, less than 25%, less than 20%, less than 15% from the top of the respective side.

Figure 4A:
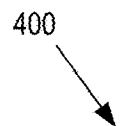
FIG. 4A is a front perspective view of the rabbit litter box illustrating the bottom rigid section and paper tray.
Figure 4A:
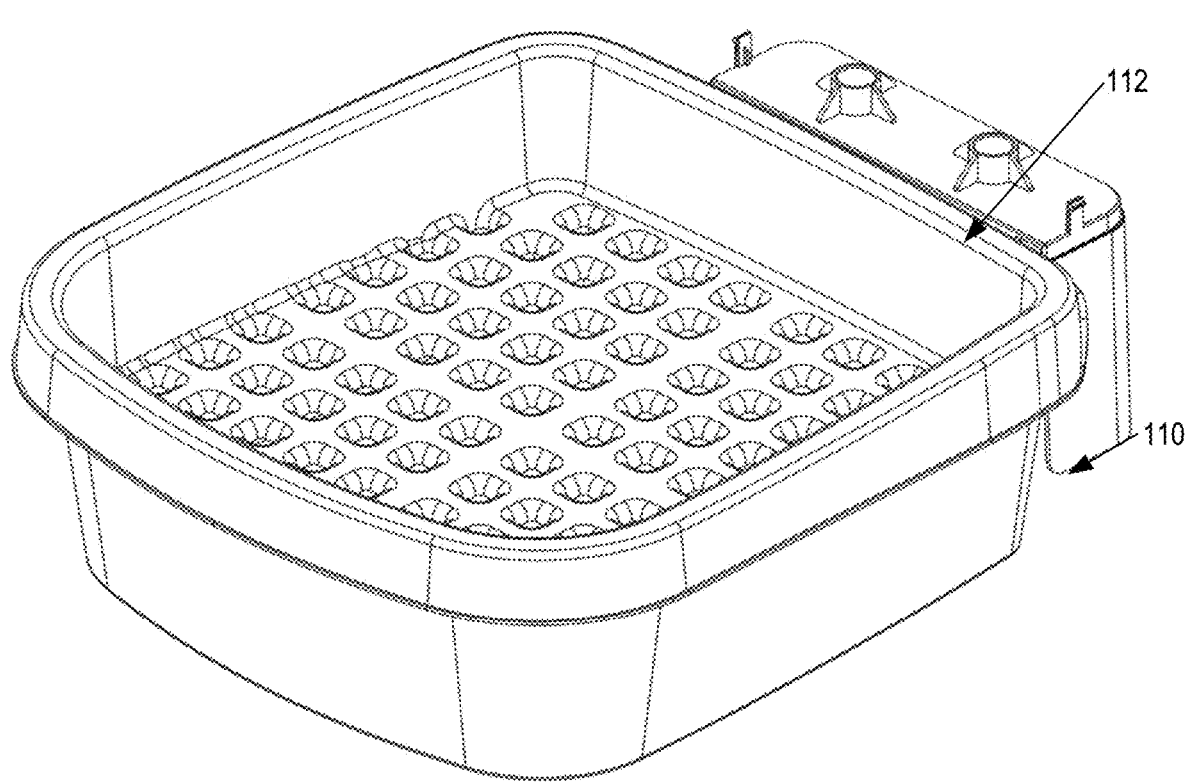
Figure 4B:
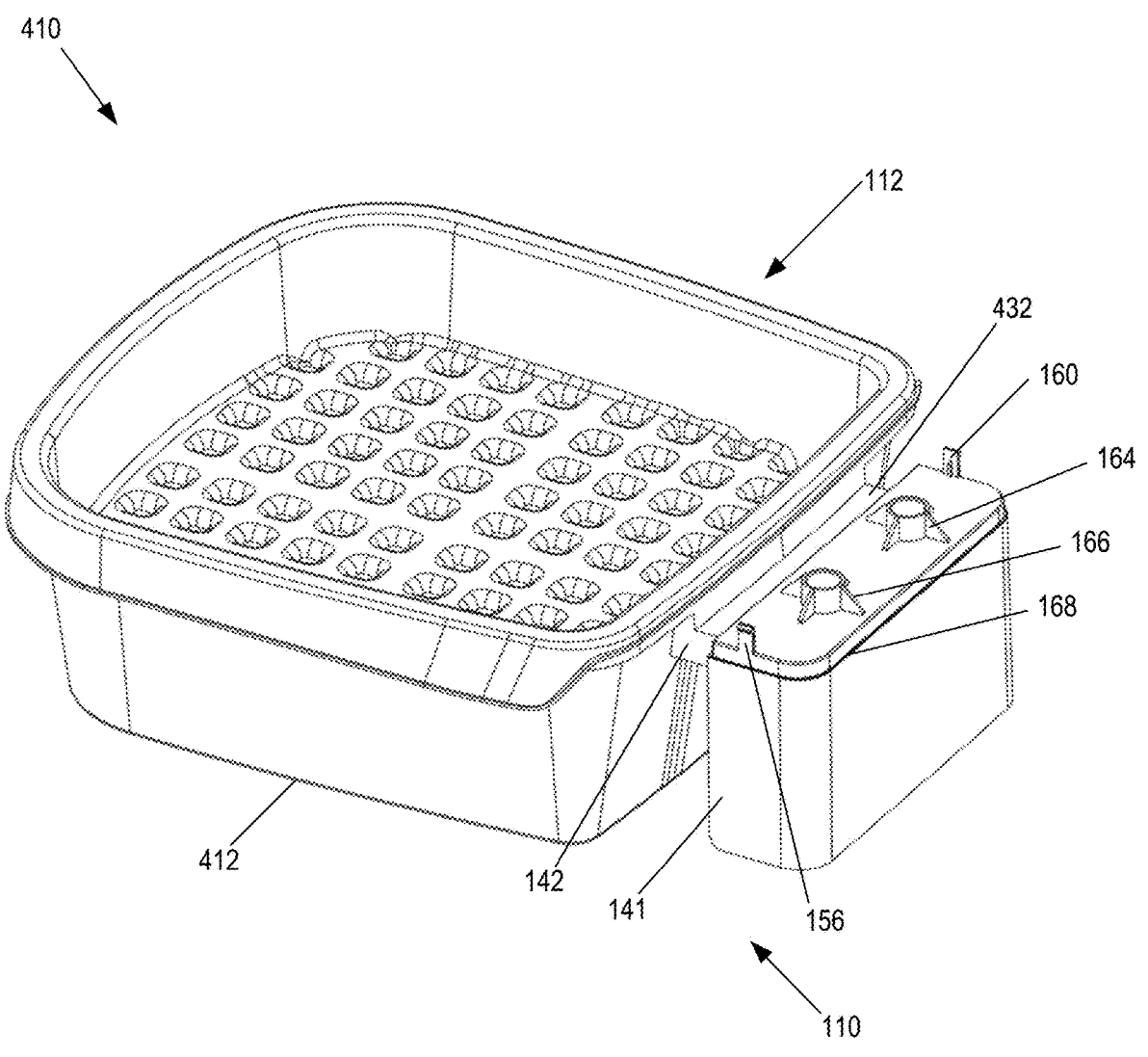
FIG. 4B is a rear perspective view of the rabbit litter box illustrating the bottom rigid section and paper tray, showing the bottom rigid section composed of front bottom rigid section supporting the paper tray and a rear bottom rigid section supporting the feeder section.
Figure 4C:
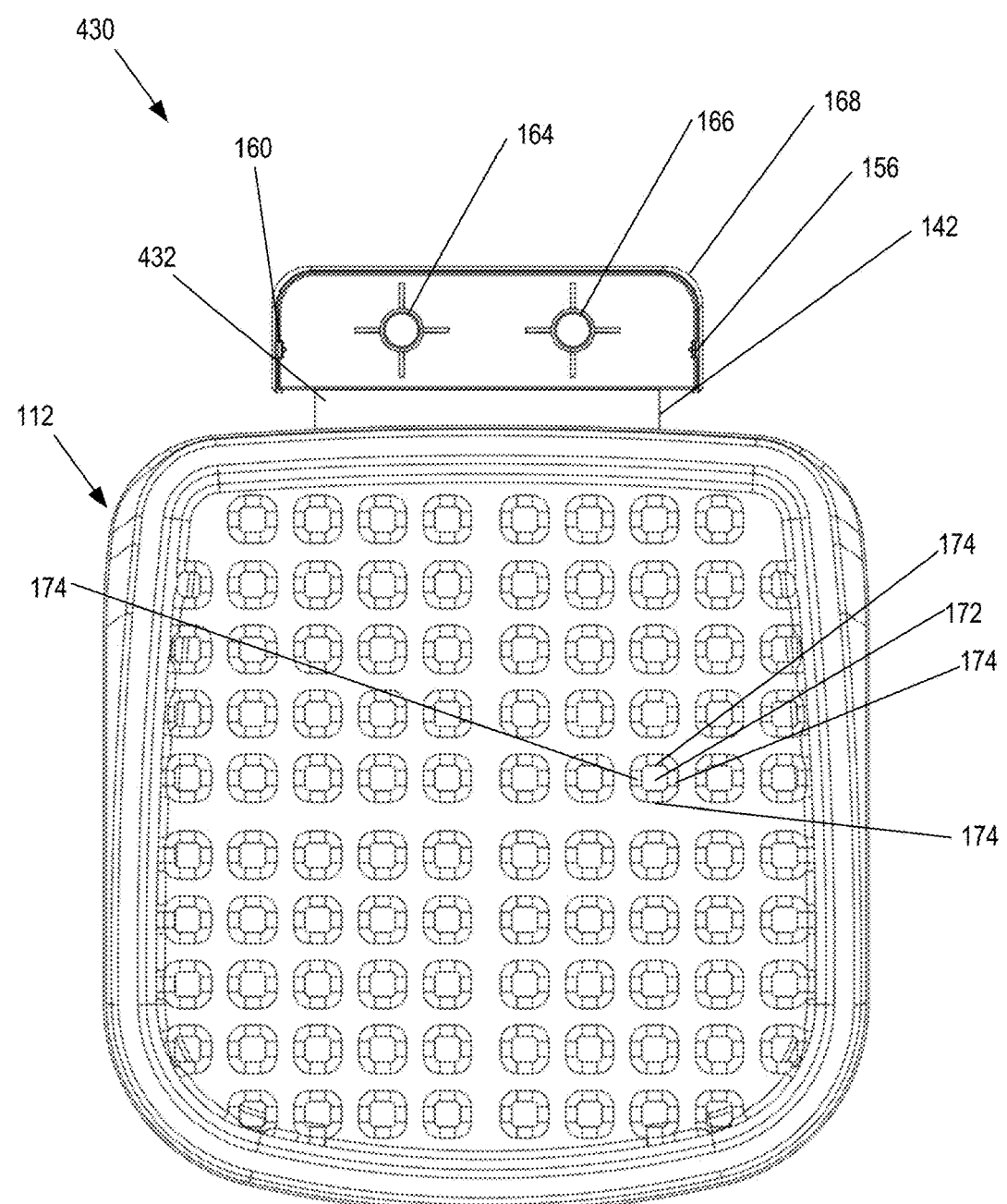
FIG. 4C is a top view of the rabbit litter box illustrating the rear bottom rigid section supporting the feeder section and the paper tray.

FIGS. 4A-C shown various views of the rabbit litter box. For example, FIG. 4A is a front perspective view 400 of the rabbit litter box illustrating the lower layer 110 (which may comprise a bottom rigid section) and the upper layer 112 (which may comprise a paper tray). FIG. 4B is a rear perspective view 410 of the rabbit litter box illustrating the lower layer 110 and upper layer 112, showing the lower layer 110 that may be composed of front bottom rigid section 412 supporting the upper layer 112 (which may comprise the paper tray) and support structure 141, which may comprise a rear bottom rigid section that supports the feeder section. As shown in FIG. 4B, a plurality of connecting brackets 142, 432 may connect front bottom rigid section 412 to support structure 141.

Figure 4D:
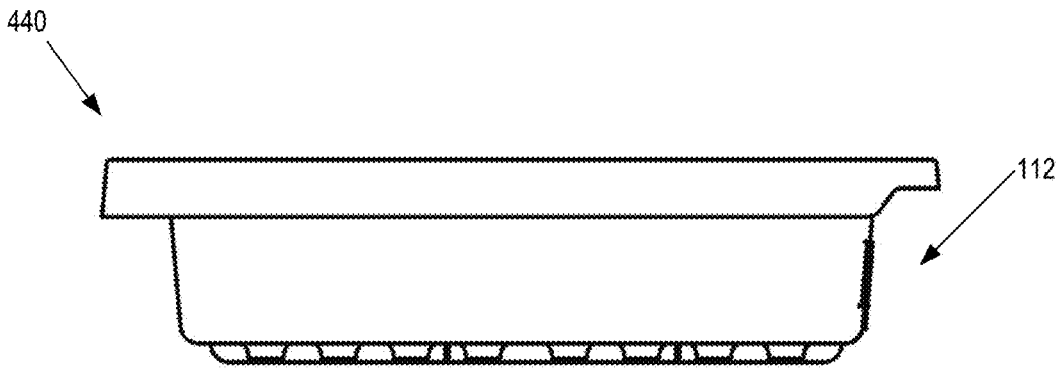
FIG. 4D is an exploded view of the rabbit litter box illustrating the paper tray, the flexible plastic layer, and the rigid bottom section.
Figure 4D:
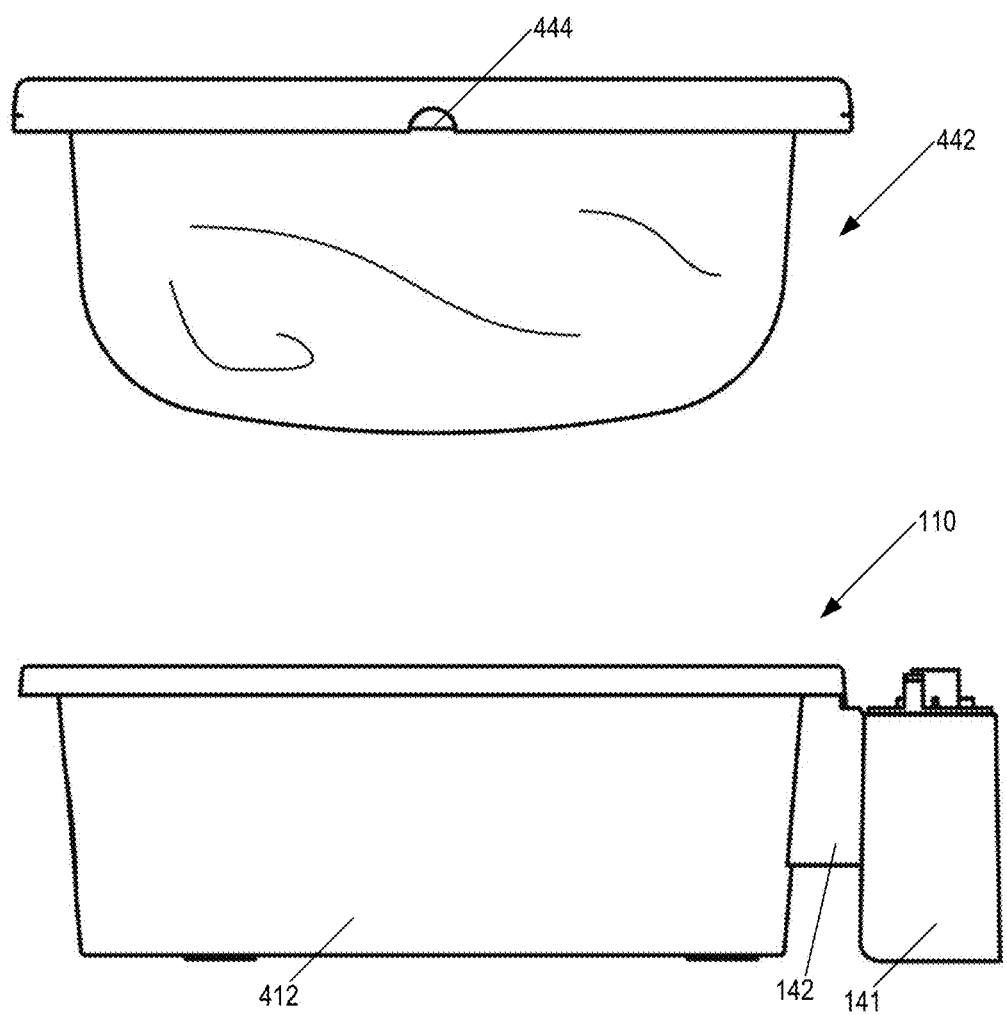
Figures 4E, 4F:
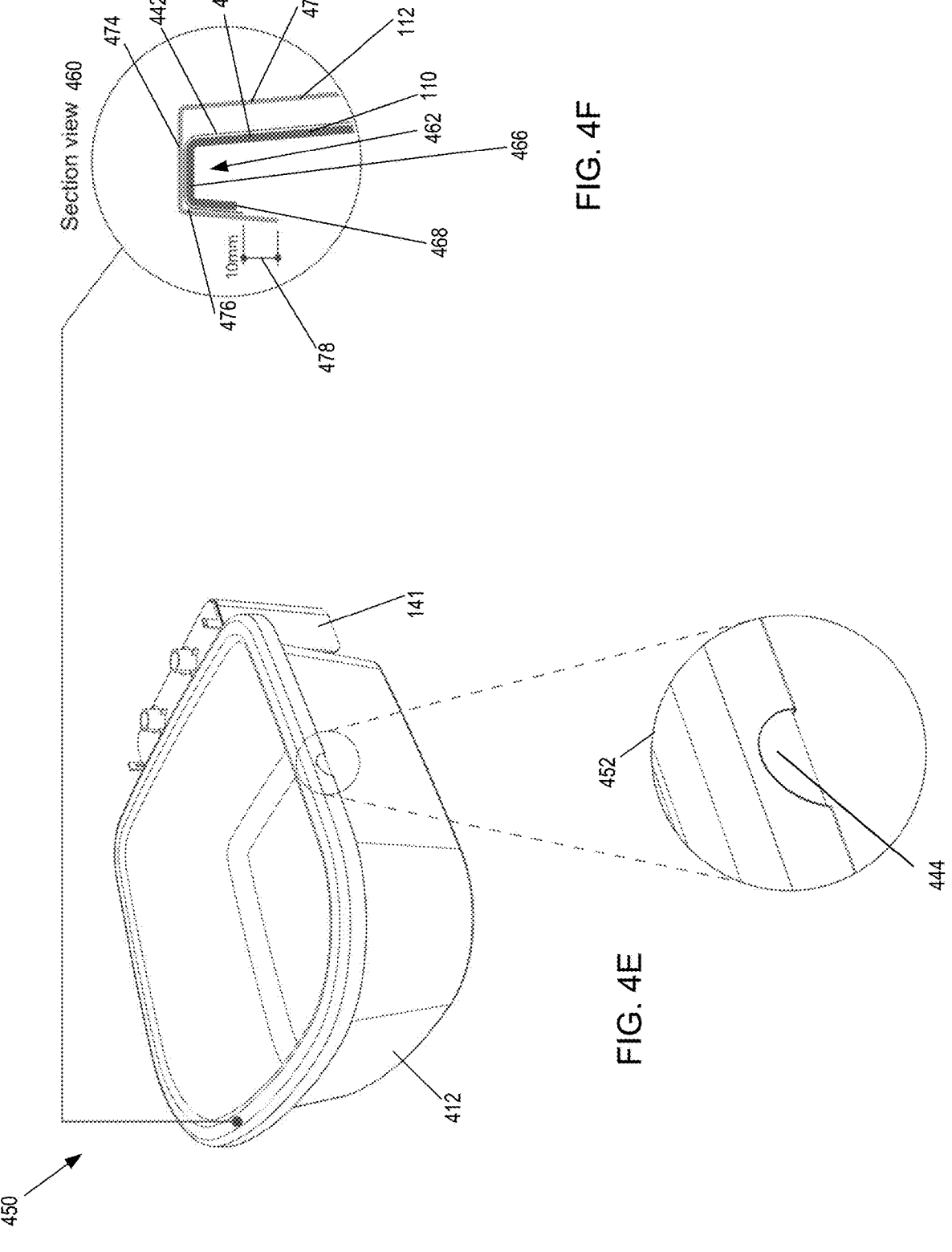
FIG. 4E is a front perspective view of the flexible plastic layer installed in the rigid bottom section, with a highlighted view of the rim of the flexible plastic layer when installed.
FIG. 4F is a section view of the paper tray, the flexible plastic layer and the rigid bottom section when installed.

FIG. 4C is a top view 430 of the rabbit litter box illustrating the support structure 141 supporting the feeder section and the upper layer 112. As shown, upper layer may include a plurality of holes 172, which may be shaped. The holes 172 may be round in shape or may be multi-sided (such as illustrated by the four sides 174 in FIG. 4C, which may comprise curved surfaces). In one or some embodiments, the side(s) (whether the hole is a circle or multi-sided) may be beveled or slanted, such as illustrated in FIG. 4C. In this way, any urine or feces may fall more easily through the holes 172. FIG. 4C further illustrates FIG. 4D is an exploded view 440 of the rabbit litter box illustrating the upper layer 112 (which may comprise a paper tray, such as a cellulose-based tray), at least one middle layer 442 (which may comprise a flexible plastic layer), and the lower layer 110 (which may comprise a rigid bottom section). As shown, the at least one middle layer 442 may include a tie or a drawstring 444 in order to cinch the at least one middle layer 442 to the lower layer 110, such as illustrated in FIGS. 4E-F. After which, upper layer 112 may be placed on top of the at least one middle layer 442.

FIG. 4E is a front perspective view 450 of the at least one middle layer 442 (which may comprise a flexible plastic layer) installed on the lower layer 110 (which may comprise a rigid bottom section), with a highlighted view 452 of the rim showing drawstring 444 of the at least one middle layer 442 when installed.

FIG. 4F is a section view 460 of the upper layer 112 (which may comprise a paper tray), the at least one middle layer 442 (which may comprise the flexible plastic layer), and the lower layer 110 (which may comprise the rigid bottom section). As shown, upper layer 112 may include different sides, including 472, 474, 476 thereby forming a generally U-shaped cross-section. Further, lower layer 110 may include different sides, including 464, 466, 468 thereby forming a generally U-shaped cross-section (and including cavity 462). Finally, the at least one middle layer 442, which may be flexible in shape, may follow or conform to the sides 464, 466, 468 of the lower layer. As shown, side 476 of the upper layer 112 may extend beyond the side of either the at least one middle layer 442 or side 468 of lower layer 110. Thus, since the upper layer 112 covers the at least one middle layer 442 and the lower layer 110, the rabbit, when trying to nibble on the litter box, may nibble on the upper layer 112 (which is made of paper and not of potential harm to the rabbit) instead of one the at least one middle layer 442 (which may be composed of plastic and of potential harm to the rabbit) or instead of the lower layer 110.

Figure 5A:
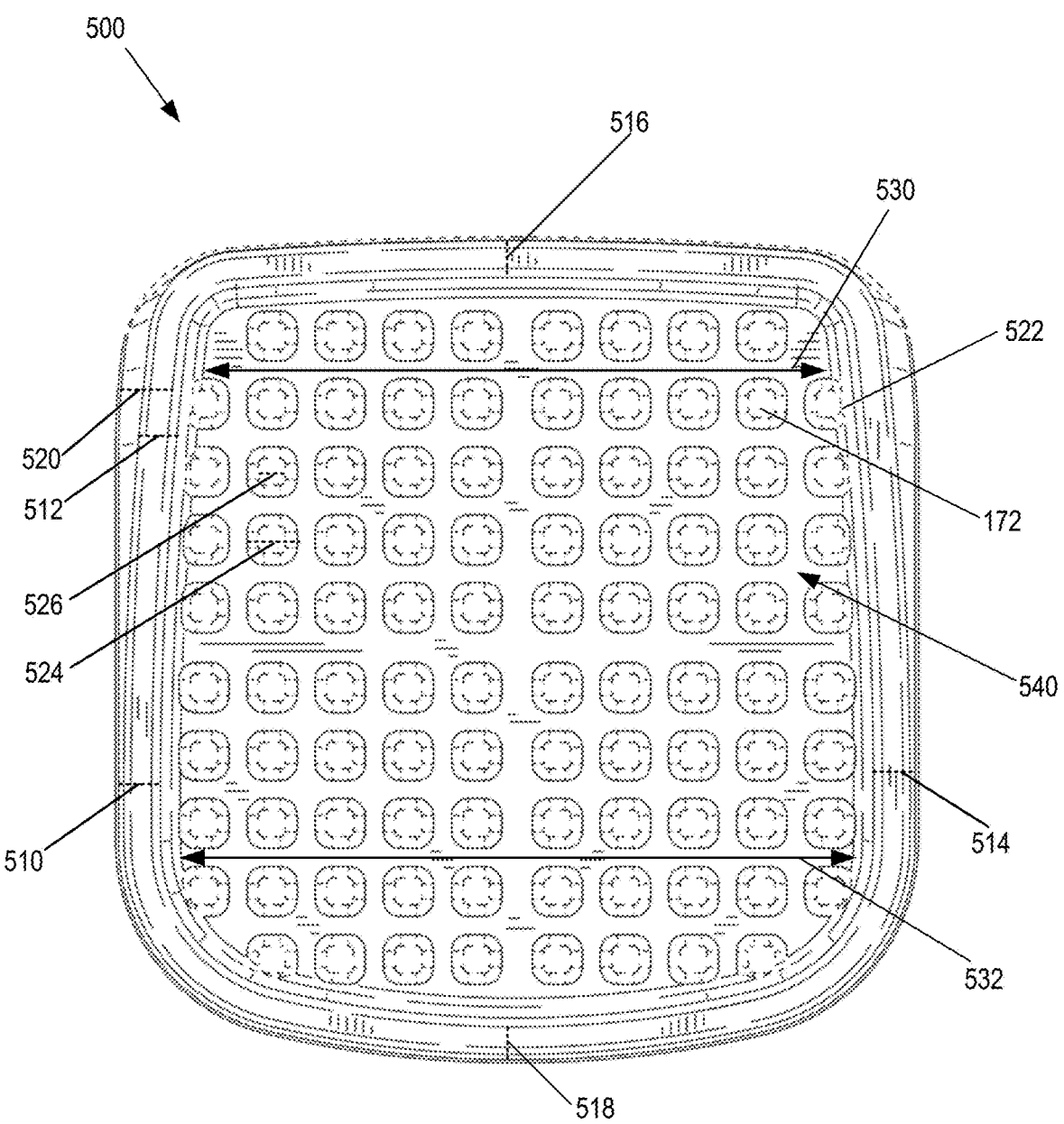
FIG. 5A is a top view of the paper tray.
Figure 5B:
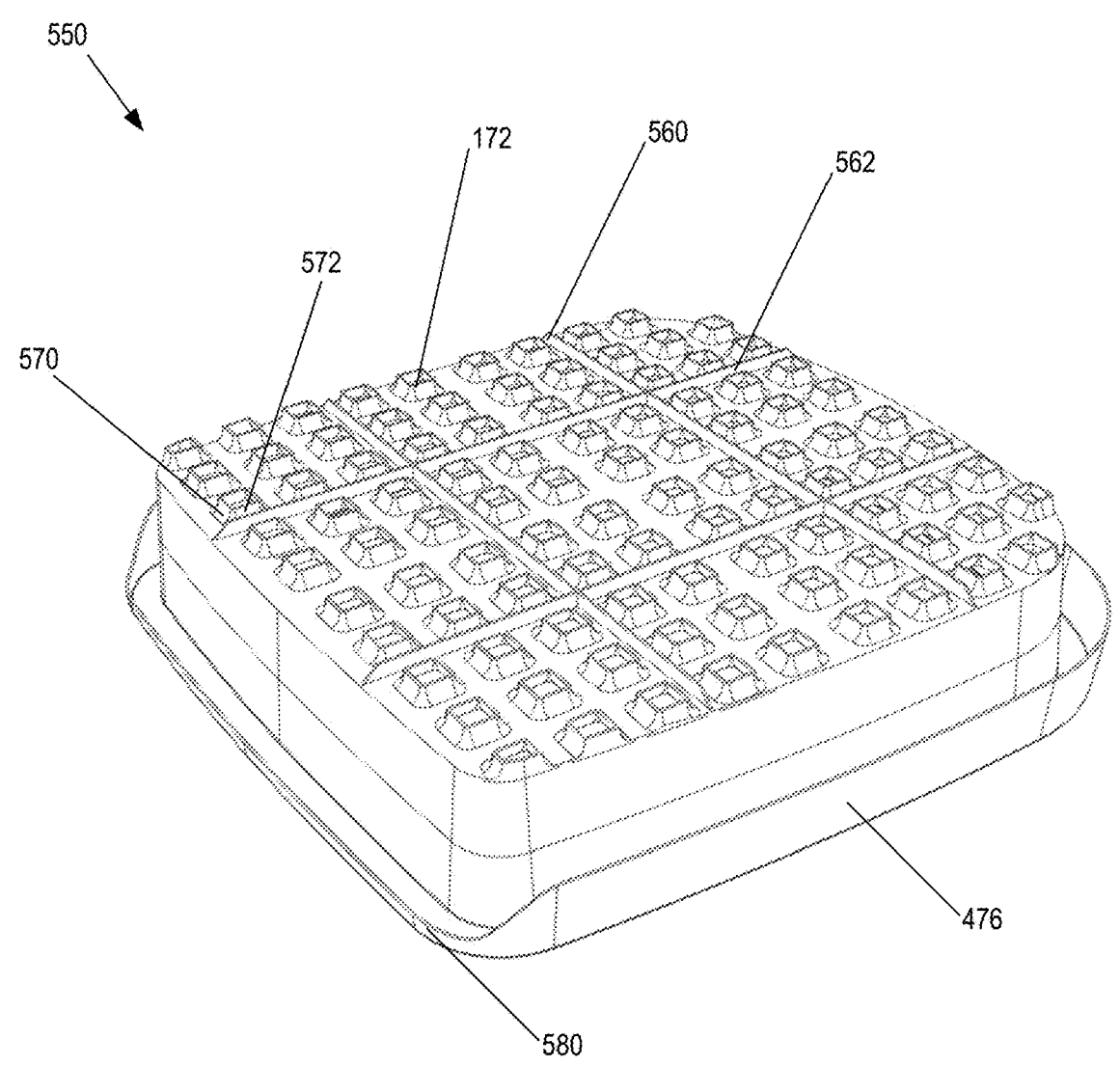
FIG. 5B is a bottom perspective view of the paper tray.

As discussed above, the upper layer 112 may comprise a paper tray, a top view 500 of which is illustrated in FIG. 5A and a bottom perspective view 550 of which is illustrated in FIG. 5B. As shown, upper layer 112 may include a plurality of holes 172. Further, in one or some embodiments, the holes 172 may be formed on a bottom 540 of the paper tray by one or more curved surfaces (see 174 in FIG. 1F). The bottom 540 has an upper surface that faces upward (e.g., the walls of the upper layer 112) and a lower surface. The underside of the curves is illustrated in FIG. 5B as 570, 572. For example, the holes 172 may include a plurality of sides (such as four sides 174), with one, some or each of the sides being curved or beveled (e.g., the opening of the hole is greater at an upper side of the upper layer 112 than at a lower side of the upper layer). This is illustrated, for example, in FIG. 5A in which the width of the hole 172 on the bottom of the upper layer 112 is shown as 524, whereas the width of the hole 172 on the underside of the upper layer (due to the beveling) is shown as 526, which is narrower than 524. The extended depth of the hole 172 (via the curved sides as shown by 570, 572) enables the bottom 540, which is much thinner than the curved sides, to be strengthened. As one example, the curved sides may be greater than the thickness of the bottom 540 of the paper tray. As another example, the curved sides may be at least 25% greater in thickness than the thickness of the bottom 540 of the paper tray, at least 30% greater in thickness than the thickness of the bottom 540 of the paper tray, at least 40% greater in thickness than the thickness of the bottom 540 of the paper tray, at least 50% greater in thickness than the thickness of the bottom 540 of the paper tray, at least 60% greater in thickness than the thickness of the bottom 540 of the paper tray, at least 70% greater in thickness than the thickness of the bottom 540 of the paper tray, at least 80% greater in thickness than the thickness of the bottom 540 of the paper tray, at least 90% greater in thickness than the thickness of the bottom 540 of the paper tray, at least 100% greater in thickness than the thickness of the bottom 540 of the paper tray, at least twice the thickness of the bottom 540 of the paper tray, or at least three times the thickness of the bottom 540 of the paper tray. In this way, the holes (being extended by the walls as shown by 570, 572) give the bottom 540 of the paper tray a corrugated structural aspect, adding to its strength.

Alternatively, the holes 172 may be circular in shape, with the circular hole being beveled or curved (e.g., the opening of the hole is greater at an upper side of the upper layer 112 than at a lower side of the upper layer).

Thus, FIG. 5A illustrates the bottom 540 of the upper layer 112 having a plurality of holes 172. In one or some embodiments, the bottom of the upper layer 112 may be rectangular or square in shape. Alternatively, the bottom of the upper layer 112 may taper, so that the width at 532 may be wider than the width at 530 (e.g., the bottom is non-rectangular or non-square in shape), as shown in FIG. 5A. Because of this, in one or some embodiments, certain ones of holes 172 may be symmetrical, effectively cutting a portion of the hole by the sidewall of the upper layer 112. This is shown by hole 522, which is lopsided, and which has at least one side formed by a sidewall of the upper layer 112. Thus a consistent or uniform pattern of holes may be on the bottom of the upper layer 112, with the non-rectangular or non-square shape of the bottom of the upper layer 112 resulting in one or more of the holes being lopsided or cut off, such that at least some of the plurality of holes in an interior of the bottom 540 are not touched by the one or more sidewalls, and other holes have at least one side formed by the one or more sidewalls such that a shape of the at least one or more of the plurality of holes is different than the at least some of the plurality of holes in the interior.

As discussed above, FIG. 4F illustrates a sectional view 460, with a U-shape being formed by sides 472, 474, 476. In one or some embodiments, side 474 (which is effectively the top portion of the upper layer 112) may be equal along a periphery of the upper layer 112, as shown by 510, 514, 516, 518. Because the bottom of the upper layer 112 is tapered, as shown in FIG. 5A, and in order to make it easier to seat upper layer onto lower layer 110 (with the at least one middle layer, such as bag 900, therebetween), the side wall of the upper layer (depicted as 576 in FIG. 4E) may bow outward. This is illustrated in FIG. 5A, where wall 576 does not bow outward at 510, but bows outward nearer to 512 (as shown by 520).

Further, for additional rigidity, upper layer 112 may include one or more braces 560, 562, which is an example of a bracing structure integrated with or formed as a unitary part of the upper layer 112 and which may cross one another at 90° angles. In one or some embodiments, upper layer 112 may include a plurality of sides 476 that form an overhang 478. In one or some embodiments, each of the plurality of sides for the overhang 478 are the same length. Alternatively, one or more of the side may have a different length. This is illustrated in FIG. 5B, in which side 476 is longer than side 580, which may face the feeder section. In this regard, when the upper layer 112 is placed on the bag 900 (discussed further below), one or both of the following occurs: (1) one or more of sides 476 of upper layer 112 cover bag 900 (which is illustrated in FIG. 4F) so that the animal cannot chew on the bag 900 (which may be plastic) on those one or more sides 476; or (2) one or more of sides 580 is shorter than one or more other sides 476 of the upper layer 112 so that when installed or places on top of bag 900, the one or more sides 580 that are shorter make it easier to remove or lift the upper layer 112 upward, as discussed above.

Figure 6:
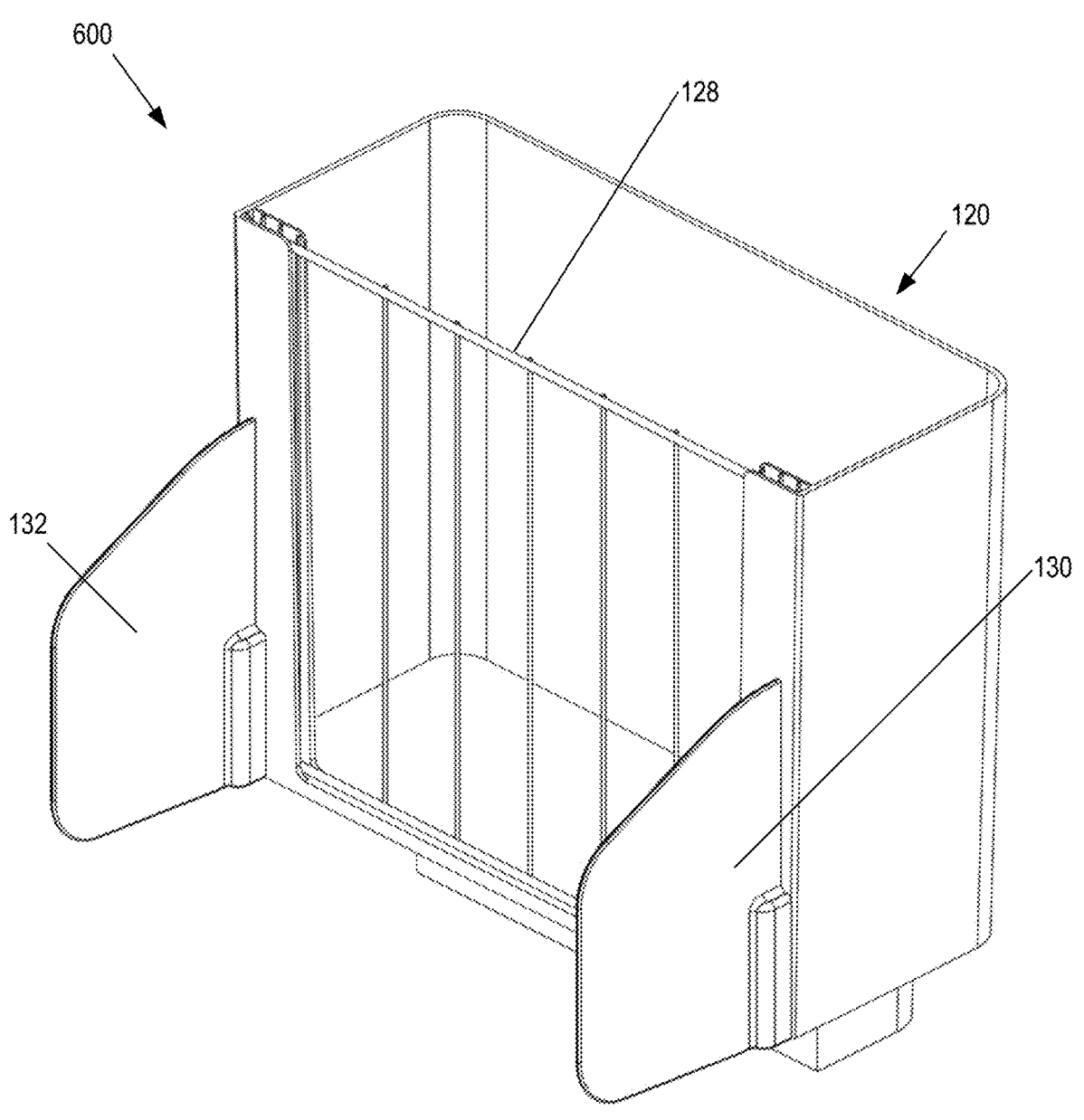
FIG. 6 is a front perspective view of the feeder section and side panels.
Figure 7A:
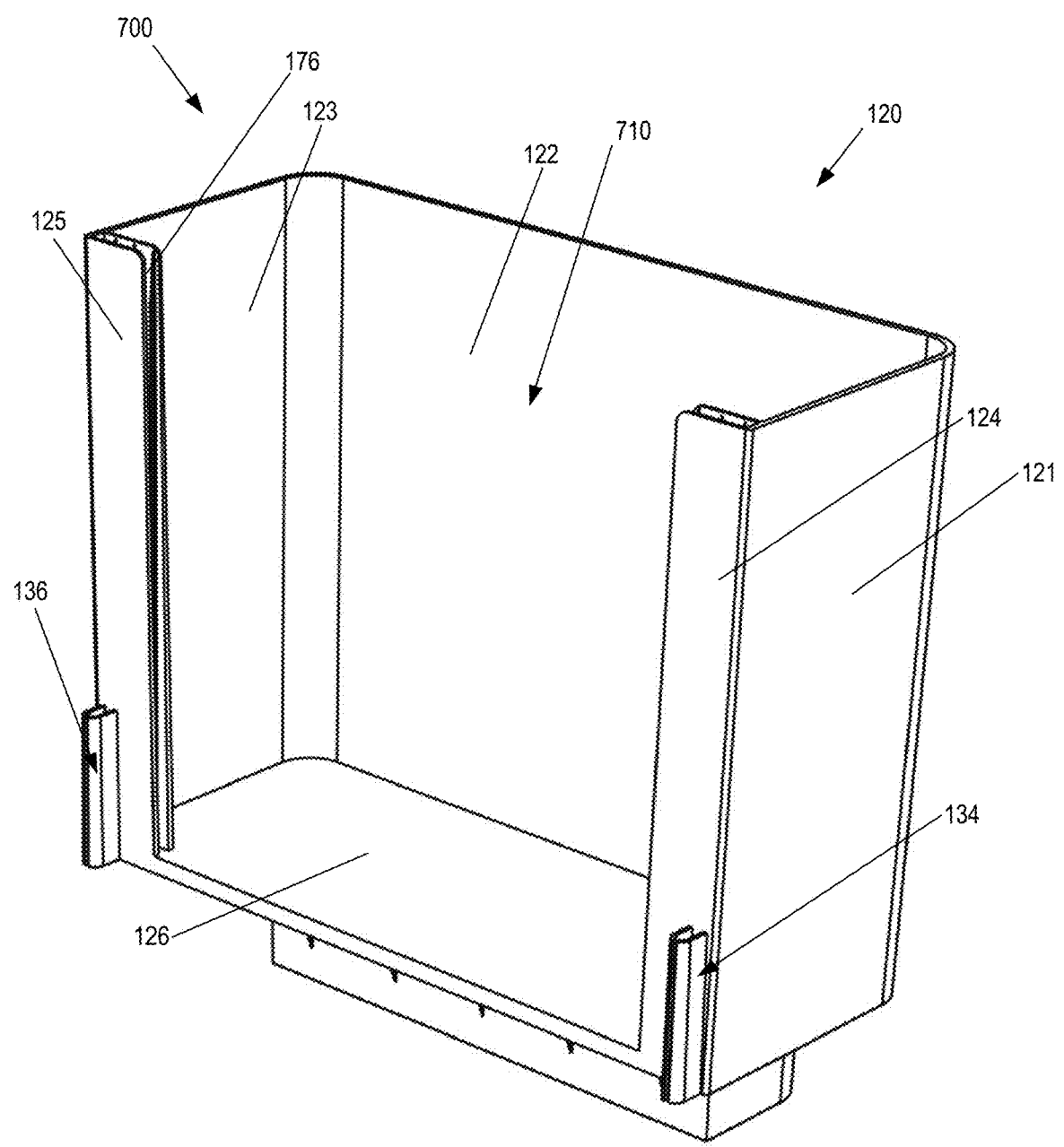
FIG. 7A is a front perspective view of the feeder section without the grille.

FIG. 6 is a front perspective view 600 of the main section of the feeder section 120, the side panels 130, 132, and grate 128, disconnected from the animal litter box. As discussed above, the feeder may be disconnected from the animal litter box for cleaning or the like. FIG. 7A is a front perspective view 700 of the feeder without the grate 128. As shown, the feeder section 120 may include a cavity 710 therein.

Figure 7B:
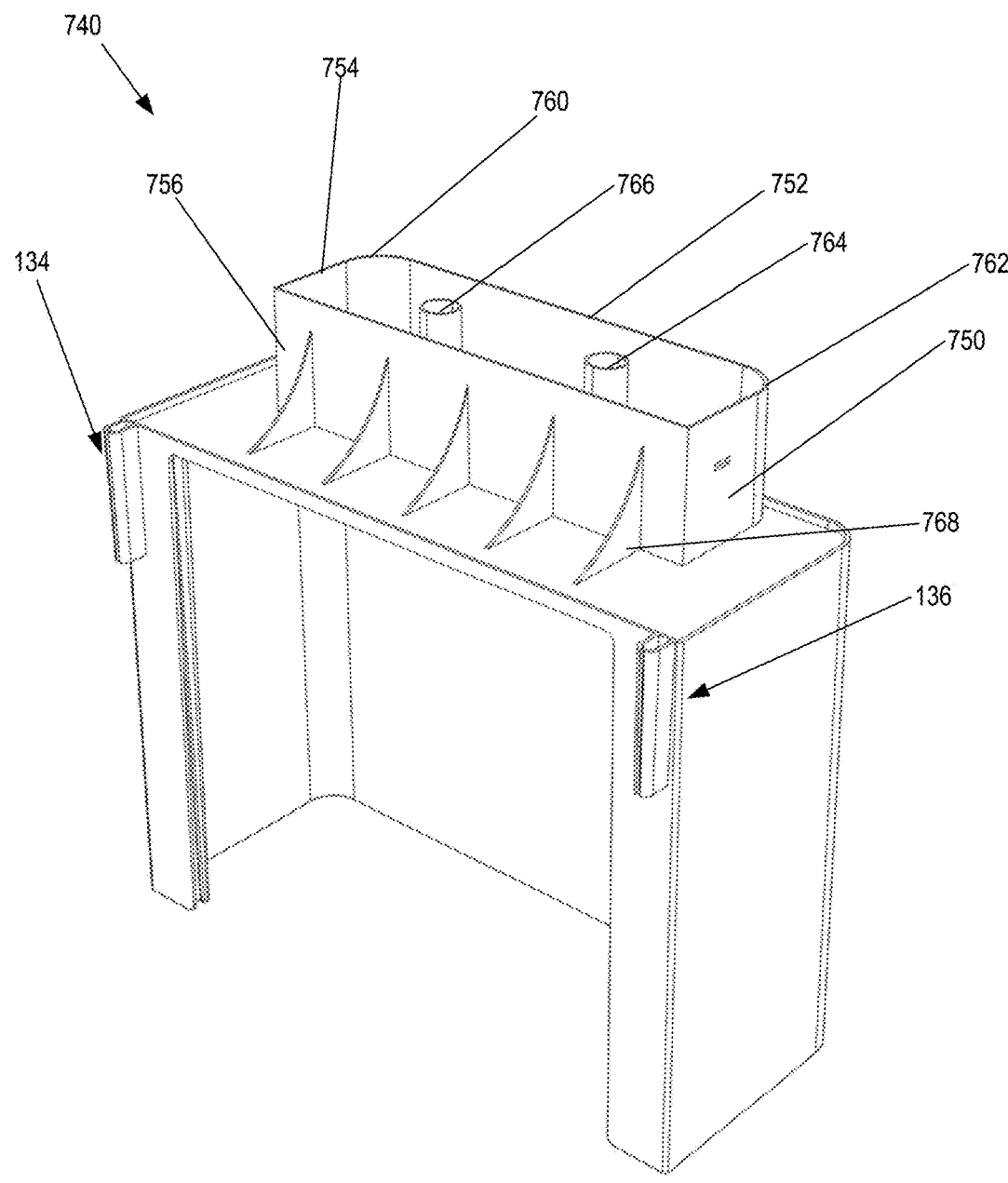
FIG. 7B is a bottom perspective view of the feeder section without the grille.
Figure 7C:
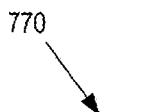
FIG. 7C is a bottom view of the feeder section without the grille.
Figure 7C:
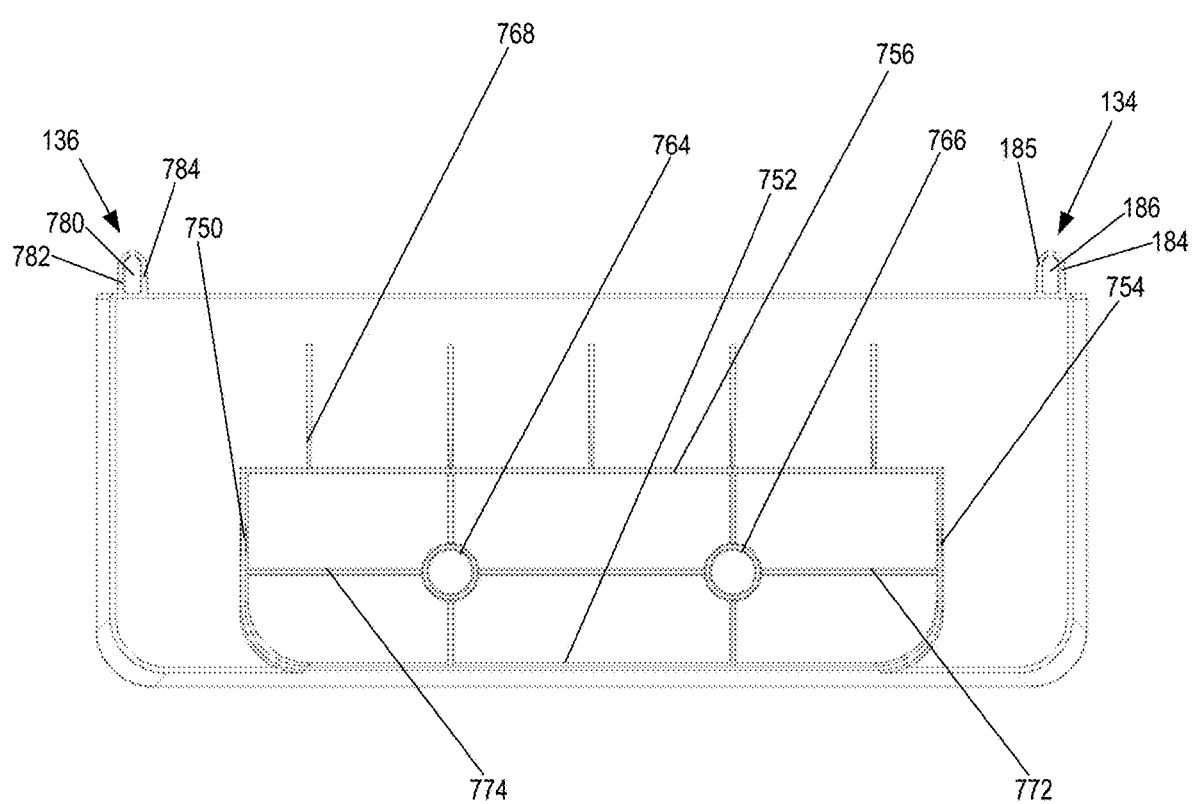

FIG. 7B is a bottom perspective view 740 of the feeder without the grate 128. FIG. 7C is a bottom view 770 of the feeder without the grate 128. The bottom of the feeder section 120 may include a one or more walls 750, 752, 754, 756, which may mate with lip 168, thereby seating the feeder section 120 with supporting structure 141, as discussed above. In one or some embodiments, part of the walls 750, 752, 754, 756 may be curved, such as shown at 760, 762. Alternatively, or in addition, The bottom of the feeder section 120 may include slots or cylinders 764, 766, which may mate with slots 164, 166 in order to connect the main body to the supporting structure 141. One or more braces 772, 774 may connect cylinders 764, 766 and walls, such as walls 750, 754. The bottom of the feeder section 120 may include one or more braces 768, which may provide rigidity or stability to the feeder. Further, FIG. 7C illustrates connectors 134, 136, including for connector 136, sides 782, 784 shaped so that a predetermined cross section or predetermined volume 780 may be formed therebetween.

Figure 8:
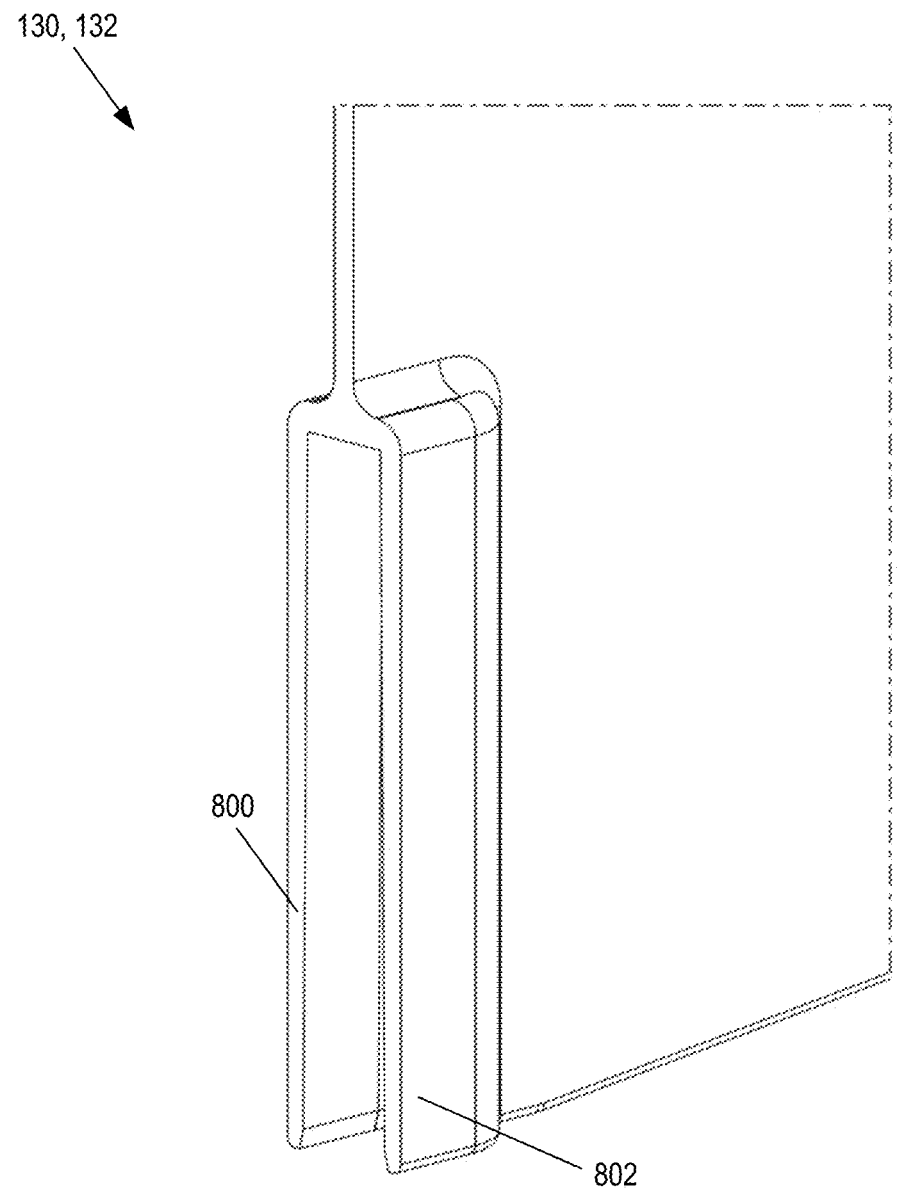
FIG. 8 is a rear perspective view of a portion of the side panel.

FIG. 8 is a rear perspective view of a portion of one example of the side panels 130, 132. As discussed above, the side panels 130, 132 may connected with connectors 134, 136 in one of several ways. In one way, side panels 130, 132 may include one or more walls 800, 802 that may engage with connectors 134, 136 (which may comprise slots).

Figure 9:
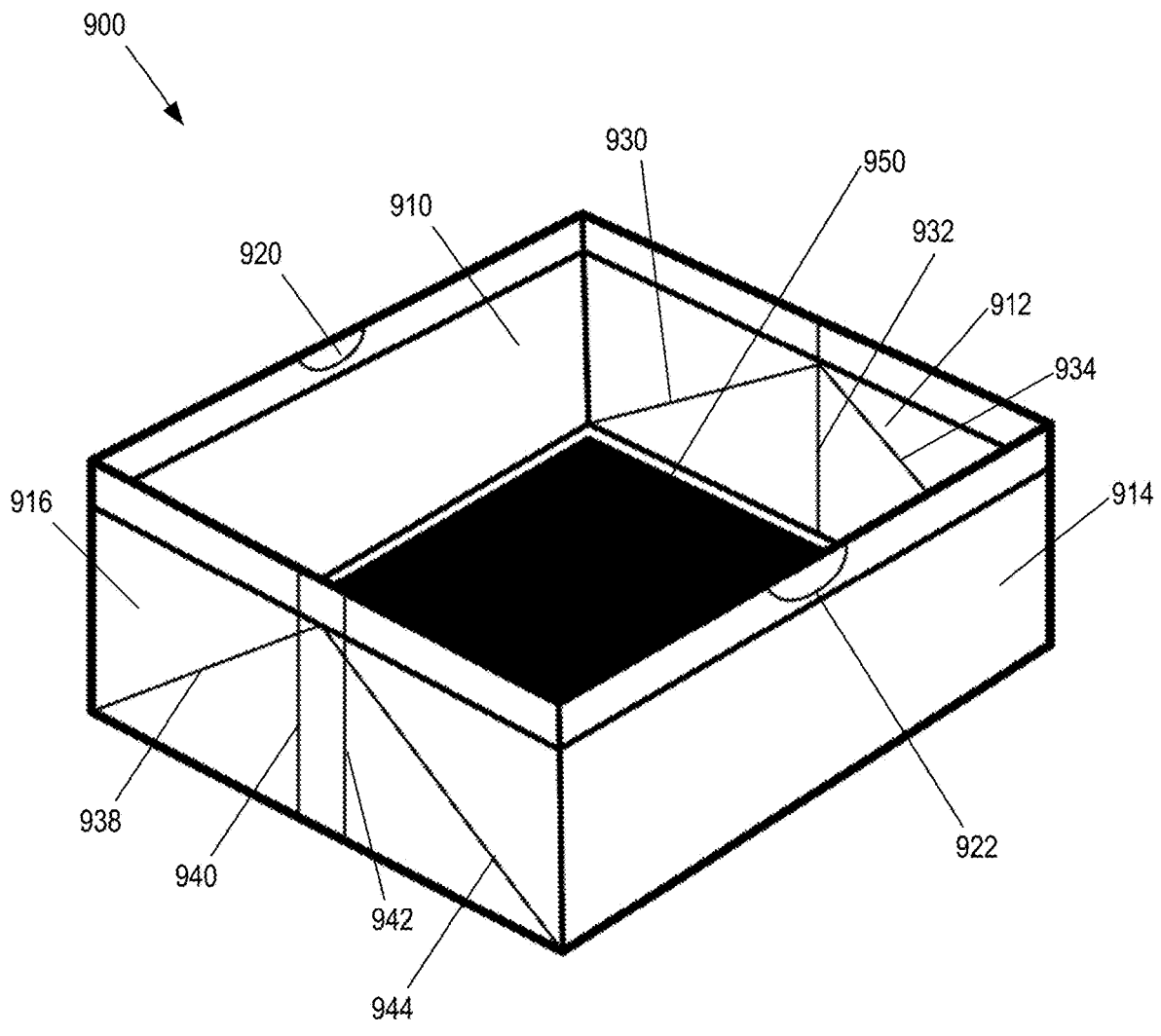
FIG. 9 is a front perspective view of the bag expanded.

FIG. 9 is a front perspective view of the bag 900 expanded. Bag 900 may be composed of a flexible material, such as a plastic-based (e.g., polyethylene) material. The bag 900 may be composed of a resin, such as resin identification code 2 or resin identification code 4. Alternatively, the bag 900 may be composed of vegetable-based bioplastics. Alternatively, the flexible bag may be cellulose-based (akin to the construction of the upper layer). In one or some embodiments, bag 900 may include a plurality of sides, such as sides 910, 912, 914, 916, and a flat bottom. In one embodiment, bag 900 may be rectangular in shape and may generally follow the shape of lower layer 110 (include the sides 305, 306, 307, 308 and/or bottom 309 of the lower layer 110). Bag 900 may further include a drawstring 920, 922, which may be cinched in order to be fitted to the shape of the lower layer 110.

In one or some embodiments, bag 900 may be, when packaged, flat in shape (e.g., creases 930, 932, 934, 936, 938, 940, 942, 944 may be positioned such that when packaged, bag 900 is rectangular in shape and folds in on itself so that bag 900 is flat). When unfurled, bag 900 may be as depicted in FIG. 9. In this regard, bag 900 may have one or more creases, such as creases 930, 932, 934, 936, 938, 940, 942, 944. Various patterns of creases are contemplated.

In one or some embodiments, bag 900 may be integrated with or work in combination with, a liquid-absorbent and/or odor-absorbent layer 950. In particular, in one embodiment, bag 900 may be heat sealed to liquid-absorbent and/or odor-absorbent layer 950. Alternatively, liquid-absorbent and/or odor-absorbent layer 950 may be placed on the bottom of bag 900.

Further, in one or some embodiments, the liquid-absorbent and/or odor-absorbent layer 950 may perform one or both of absorbing liquid or absorbing odor. In one or some embodiments, the liquid-absorbent and/or odor-absorbent layer 950 may be composed of any one, any combination, or all of: bamboo; cotton; charcoal; etc. In this regard, the liquid-absorbent and/or odor-absorbent layer 950 may comprise a bamboo fiber sheet, a charcoal fiber sheet, or a combination bamboo/charcoal fiber sheet. Further, in one or some embodiments, the liquid-absorbent and/or odor-absorbent layer 950 may be flat in shape with the size of the liquid-absorbent and/or odor-absorbent layer 950 being the same size as the bottom of bag 900 (such as illustrated in FIG. 9). Alternatively, the size of the liquid-absorbent and/or odor-absorbent layer 950 may be smaller than the size of the bottom of bag 900 (e.g., less than 80% of the size of the bottom of bag 900; less than 70% of the size of the bottom of bag 900; less than 60% of the size of the bottom of bag 900; less than 50% of the size of the bottom of bag 900; less than 40% of the size of the bottom of bag 900; etc.).

In the embodiment where the liquid-absorbent and/or odor-absorbent layer 950 is placed on the bottom of bag 900, the liquid-absorbent and/or odor-absorbent layer 950 may be changed or removed more frequently than replacing bag 900. Alternatively, bag 900 may be replaced each time the liquid-absorbent and/or odor-absorbent layer 950 is replaced.

Figure 10A:
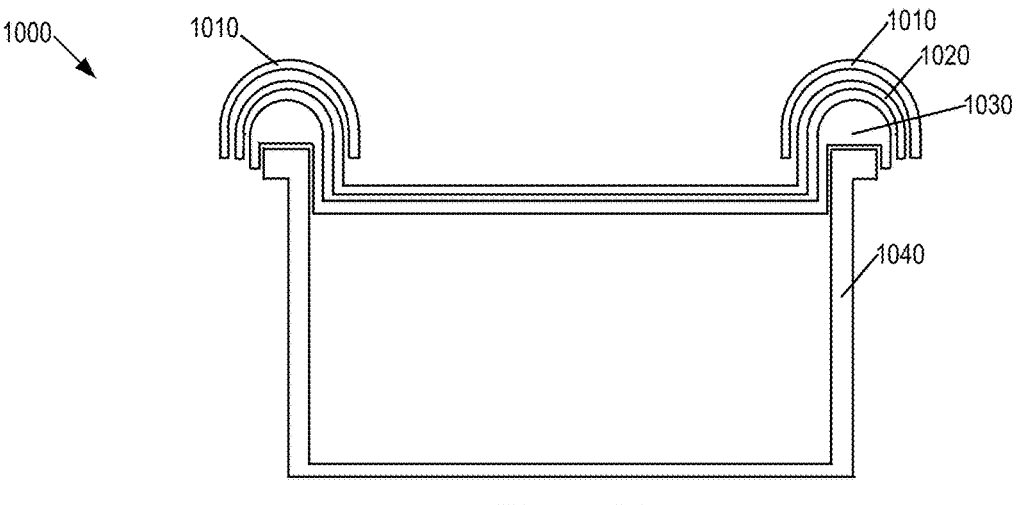
FIG. 10A is a side cutaway view of the rabbit litter box, including the lower layer, the bracing structure, the upper layer, and the clip structure.
Figure 10B:
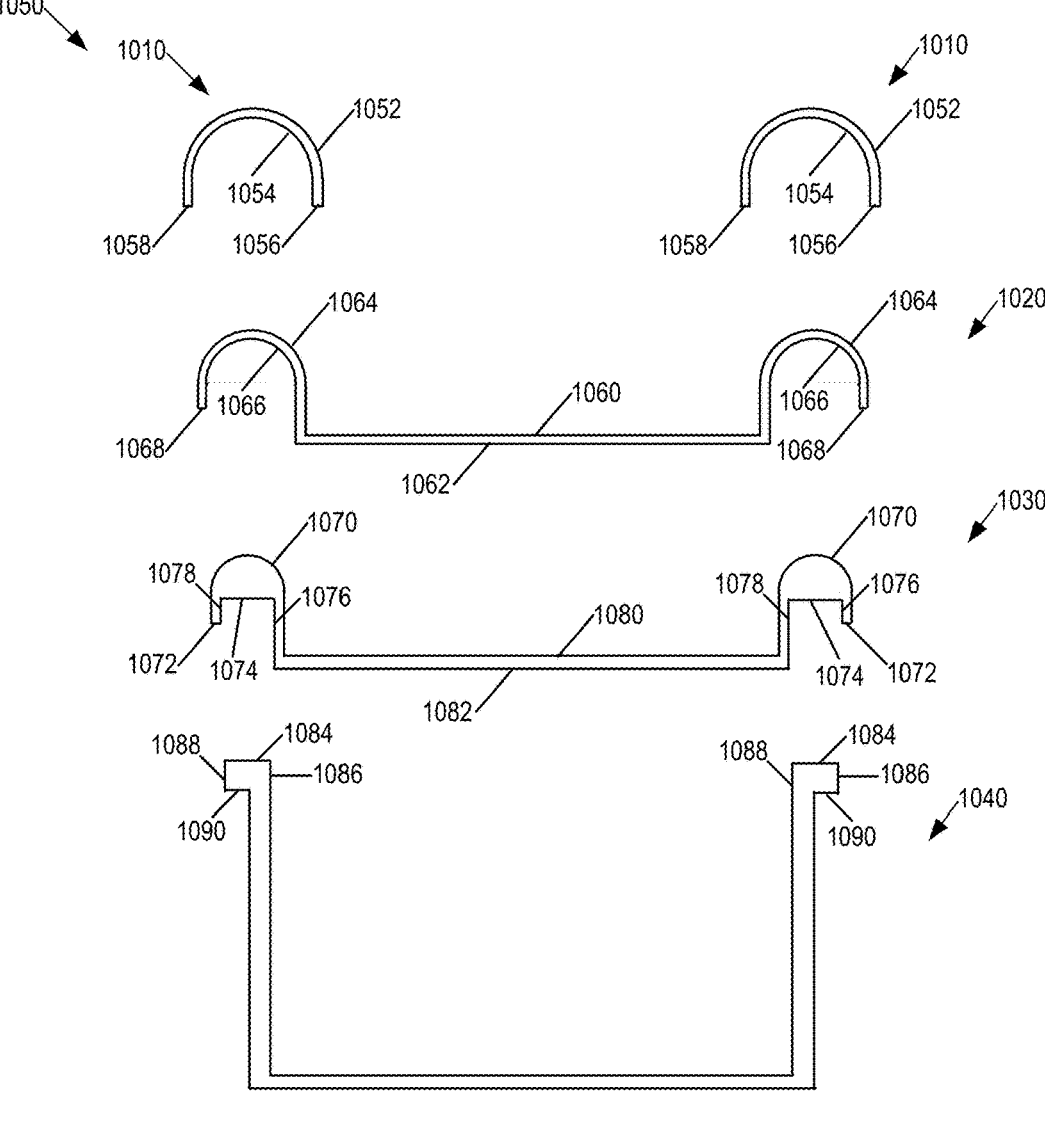
FIG. 10B is an exploded side cutaway view of the rabbit litter box of FIG. 10A.

FIG. 10A is a side cutaway view 1000 of the rabbit litter box, including the lower layer 1040, the bracing structure 1030, the upper layer 1020, and the clip structure 1010. FIG. 10B is an exploded side cutaway view 1050 of the rabbit litter box of FIG. 10A. As discussed above, the animal may gnaw on the upper layer 1020. To prevent the gnawing, the clip structure 1010 may be used to prevent gnawing on the rim of the upper layer 1020. In one or some embodiments, the clip structure 1010 may be on opposite sides of the rabbit litter box and may be of identical shape, as shown in FIGS. 10A-B. As discussed in more detail below, the clip structure 1010 may comprise a single unitary piece (e.g., see FIGS. 12A-C) or multiple pieces (e.g., see FIGS. 12D-E).

As shown, an underside 1054 of the clip structure 1010 may at least partly follow an upper side 1064 (e.g., an upper surface) of the upper layer 1020 upon which it contacts. As shown, both the underside 1054 of the clip structure 1010 and the upper side 1064 (or upper surface) of the upper layer 1020 are curved. Alternatively, or in addition, the shape may be at least partly (or entirely) flat. As shown, the upper side 1052 of the clip structure 1010 follows the general shape of the underside 1054 of the clip structure 1010, both being curved. Alternatively, or in addition, the upper side 1052 of the clip structure 1010 may be at least partly (or entirely) flat in shape. Similarly, the underside 1066 of the upper layer 1020 follows the general shape of the upper side 1064 of the upper layer 1020 (with ends 1068). Alternatively, or in addition, the underside 1066 of the upper layer 1020 may be at least partly (or entirely) flat.

In an alternate embodiment, the clip structure 1010 may at least partly follow one or both of the upper side and the lower side of the upper layer (whether the upper side and/or the lower side are curved and/or straight. For example, the clip structure may cover one, some, or all sides of a rim of the upper layer, as illustrated in FIGS. 12E-F.

Further, the ends 1056, 1058 of the clip structure 1010 are shown as equal in length. Alternatively, one end 1056, 1058 of the clip structure 1010 may be longer than the other end 1056, 1058 of the clip structure 1010. FIG. 10B further shows upper layer having a surface 1060 upon which a rabbit (or other animal) may sit.

FIG. 10B further illustrates the bracing structure 1030, which may include surface 1070 that may mate with under-side 1066. Bracing structure 1030 may further include one or more surfaces, such as any one, any combination, or all of surfaces 1074, 1076, 1078 shaped to be seated or mated with at least a part of lower layer 1040, such as any one, any combination, or all of surfaces 1084, 1086, 1088 of lower layer 1040, which may be a part of the rim of the lower layer 1040. In this regard, bracing structure 1030 may be config-ured to mate with one or both of the upper layer 1020 or the lower layer 1040.

As shown, surfaces 1074, 1076, 1078 (an end of which is shown as 1072) are each flat in order to mate with surfaces 1084, 1086, 1088. Alternatively, the bracing structure 1030, with one or more surfaces, may be seated or mated with at least a part of lower layer 1040, such as any one, any combination, or all of surfaces 1084, 1086, 1088, 1090 of lower layer 1040, effectively encasing the rim of the lower layer 1040. Still alternatively, any one, any combination, or all of surfaces 1084, 1086, 1088, 1090 may be curved, with surfaces 1074, 1076, 1078 likewise being curved in order to mate with its respective mating surface.

FIG. 10B further illustrates upper side 1080 of bracing structure 1030 and underside 1082 of bracing structure 1030. Upper side 1080 may generally following the shape of surface 1062 of upper layer 1020, with both being generally flat. In one or some embodiments, when both the upper layer 1020 and the bracing structure 1030 are installed (as shown in FIG. 10A), the bracing structure 1030 is in physical contact with the surface 1062 of the upper layer 1020 (without anything placed on the surface 1060 of the upper layer 1020). Alternatively, when both the upper layer 1020 and the bracing structure 1030 are installed, the bracing structure 1030 is not in physical contact with the surface 1062 of the upper layer 1020 (without anything placed on the surface 1060 of the upper layer 1020). Rather, the bracing structure 1030 may be a predetermined distance from the surface 1062 of the upper layer 1020 (e.g., upper side 1080 of the bracing structure 1030 is greater than 0 mm but less than 3 mm from the surface 1062 of the upper layer; upper side 1080 of the bracing structure 1030 is greater than 0 mm but less than 4 mm from the surface 1062 of the upper layer; upper side 1080 of the bracing structure 1030 is greater than 0 mm but less than 5 mm from the surface 1062 of the upper layer; upper side 1080 of the bracing structure 1030 is greater than 0 mm but less than 6 mm from the surface 1062 of the upper layer; etc.). In this way, when an animal is on the surface 1060 of the upper layer 1020, the upper layer 1020 may sag somewhat (until the surface 1062 of upper layer 1020 contacts upper side 1080 of the bracing structure 1030), effectively providing some give to the upper layer 1020 while still providing support for the upper layer 1020. It is noted that the bag, such as illustrated in FIG. 9, though not shown in FIGS. 10A-B, may be installed between bracing structure 1030 and lower layer 1040. More specifically, because the bag is malleable, the bag may follow the shape of the rim of the lower layer 1040, thereby not generally changing the shape of the rim of the lower layer 1040. So that, the shape of the mating surface(s) of the bracing structure 1030 may likewise follow the shape of the rim of the lower layer 1040. Thus, as shown, surfaces 1074, 1076, 1078 of bracing structure 1030 may contact or be seated in the rim of the lower layer 1040, such as surfaces 1084, 1086, 1088.

Figure 10C:
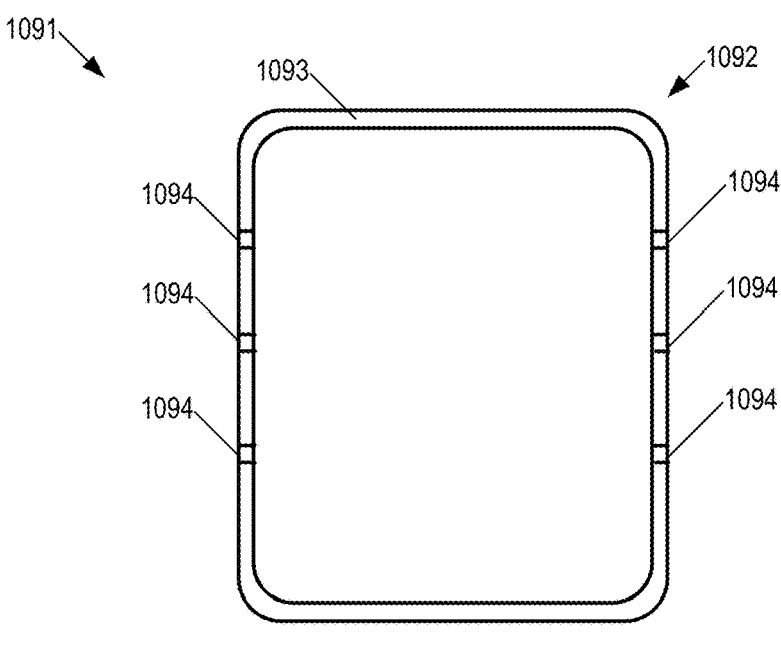
FIG. 10C is a top view of the lower layer with indentations.
Figure 10D:
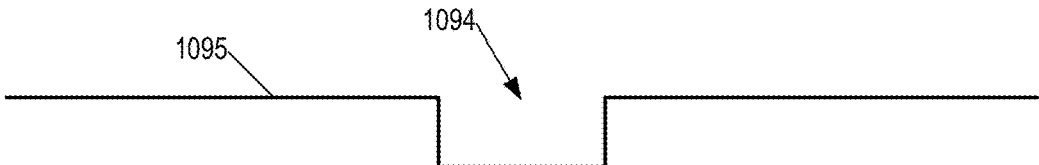
FIG. 10D is a side view of rim of the lower layer with indentations.

Alternatively, the rim of the lower layer may have one or more indentations in order to seat the bracing structure. One example of the indentations is illustrated in FIGS. 10C-D, which are a top view of the lower layer with indentations and a side view FIG. 10C is a top view 1091 of the lower layer 1092 with indentations 1094, and a side view of rim 1093 (see surface 1095 of rim 1093) of the lower layer with one indentation 1094 shown. FIG. 10C illustrates that the indentations 1094 may be in pairs, on opposite sides of the lower layer in order to securely seat both sides of the bracing structure (whether the bracing structure are individual pieces (see FIGS. 11A-B) or a unitary piece (see FIGS. 11C-D). In one or some embodiments, the indentation(s) 1094 may be placed on rim 1093 in order to seat the bracing structure more securely and/or in a more predetermined manner. For example, in one or some embodiments, the bracing structure does not obstruct holes of the upper layer (see holes 1132 in FIG. 11B). In order to place the bracing structure underneath the holes of the upper layer without obstructing the holes, the bracing structure may be placed in a predetermined position in the indentation 1094 on the rim 1093.

Figure 11A:
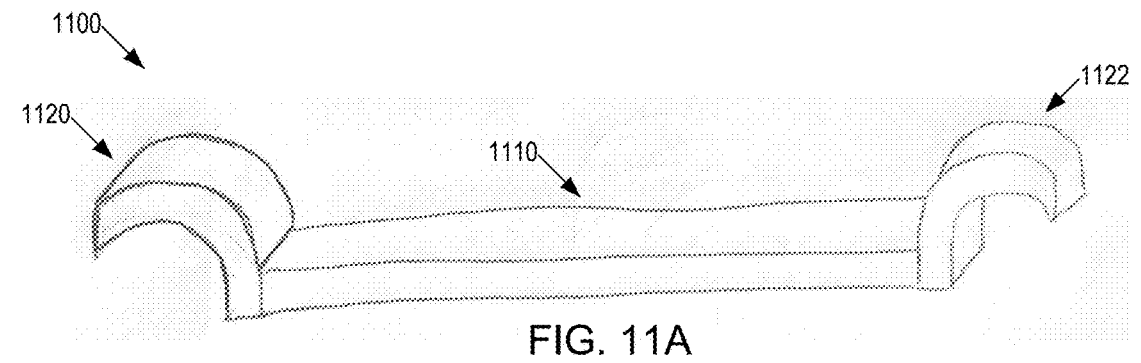
FIG. 11A is a front perspective view of one example of the bracing structure.
Figure 11B:
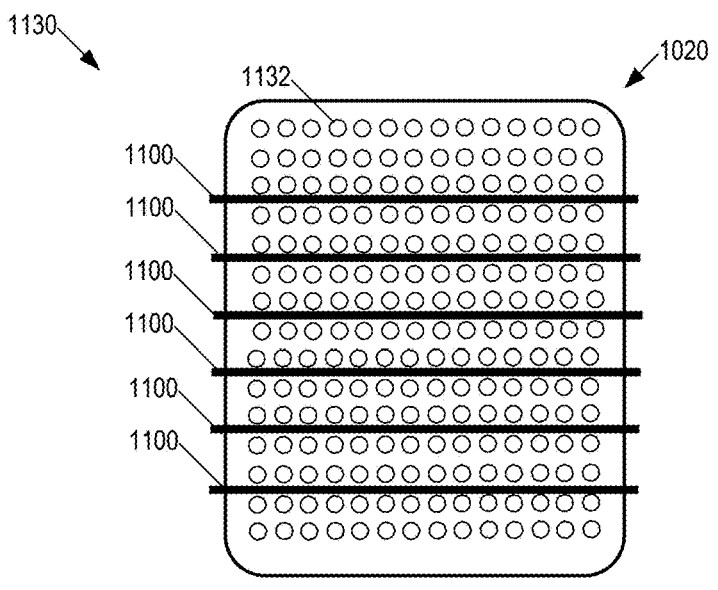
FIG. 11B is a bottom view of multiple bracing structures (as depicted in FIG. 11A) supporting the upper layer.

FIGS. 11A-D illustrate different examples of the bracing structure. In particular, FIG. 11A is a front perspective view of the first example of the bracing structure 1100, and FIG. 11B is a bottom view 1130 of the first example of the bracing structures 1100 (as depicted in FIG. 11A) supporting the upper layer. As shown in FIG. 11A, the bracing structure 1100 includes a beam portion 1110, and side portions 1120, 1122 that are configured to be placed on the lower layer (either directly or indirectly, such as via the bag). As discussed above, the side portions 1120, 1122 may be shaped to mate with the rim of the lower layer. Further, the beam portion 1110 may provide sufficient support to support an animal (which is placed on the upper layer 1020). In one or some embodiments, bracing structure 1100 may be com-posed of metal and/or hard plastic (e.g., polyvinyl chloride; acrylic or polymethyl methacrylate; polyethylene; polycar-bonate; polyethylene terephthalate; polypropylene; etc.).

In practice, one or more bracing structure 1100 may be used. As one example, a single bracing structure 1100 may be used to support upper layer 1020 (shown with holes 1132 through the upper layer 1020). As another example, a plurality of bracing structures 1100 may be used to support upper layer 1020, such as illustrated in FIG. 11B. As shown, six bracing structures 1100 are individually spaced to abut a bottom surface of upper layer 1020.

Figure 11C:
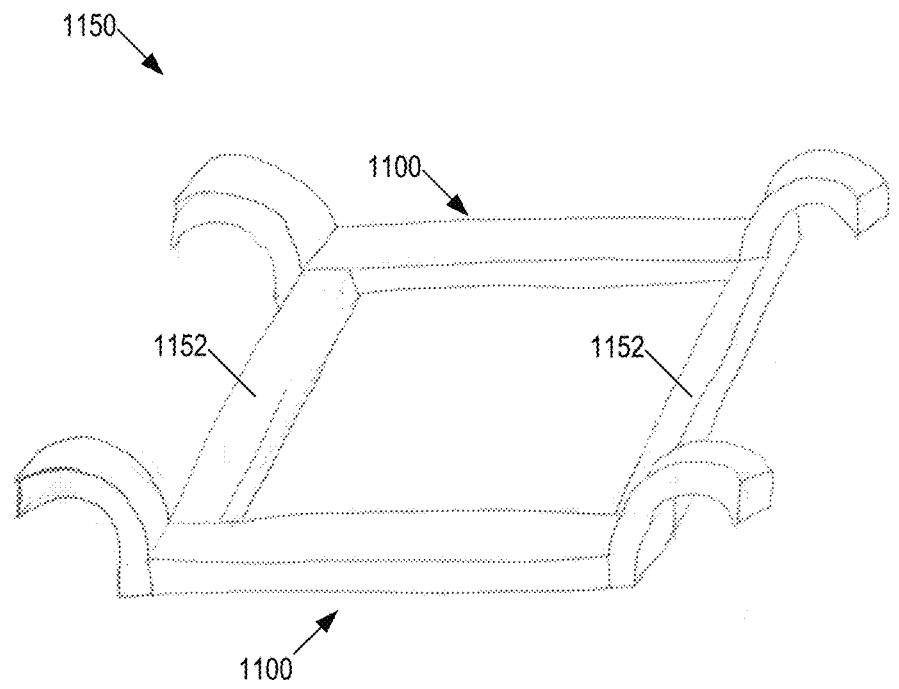
FIG. 11C is a front perspective view of another example of the bracing structure.
Figure 11D:
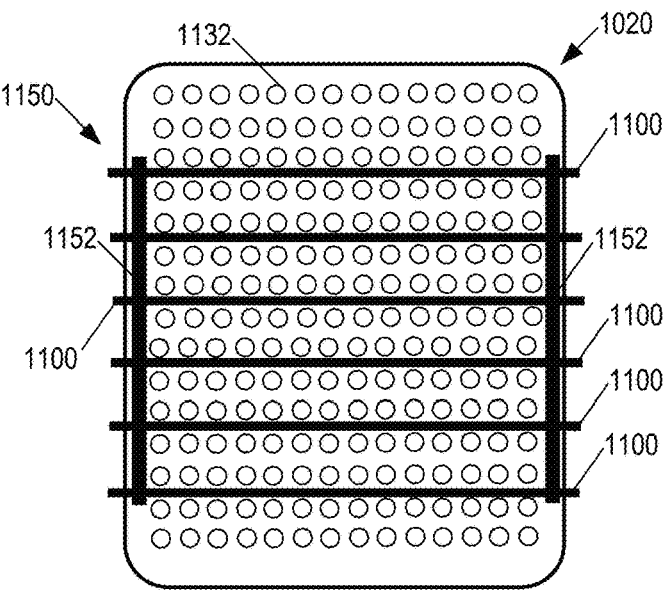
FIG. 11D is a bottom view of a bracing structure as a unitary structure supporting the upper layer.

FIG. 11C is a front perspective view of a second example of the bracing structure 1150. FIG. 11D is a bottom view of a unitary bracing structure 1150 as a unitary structure supporting the upper layer 1020. In one or some embodi-ments, the unitary bracing structure 1150 comprises a plu-rality of bracing structures 1100 illustrated in FIG. 11A in combination with a support structure. This is illustrated, for example, in FIG. 11D as lattice 1152. Other types of lattice, grid, or the like are contemplated to support bracing struc-tures 1100.

Figures 12A, 12B, 12C:
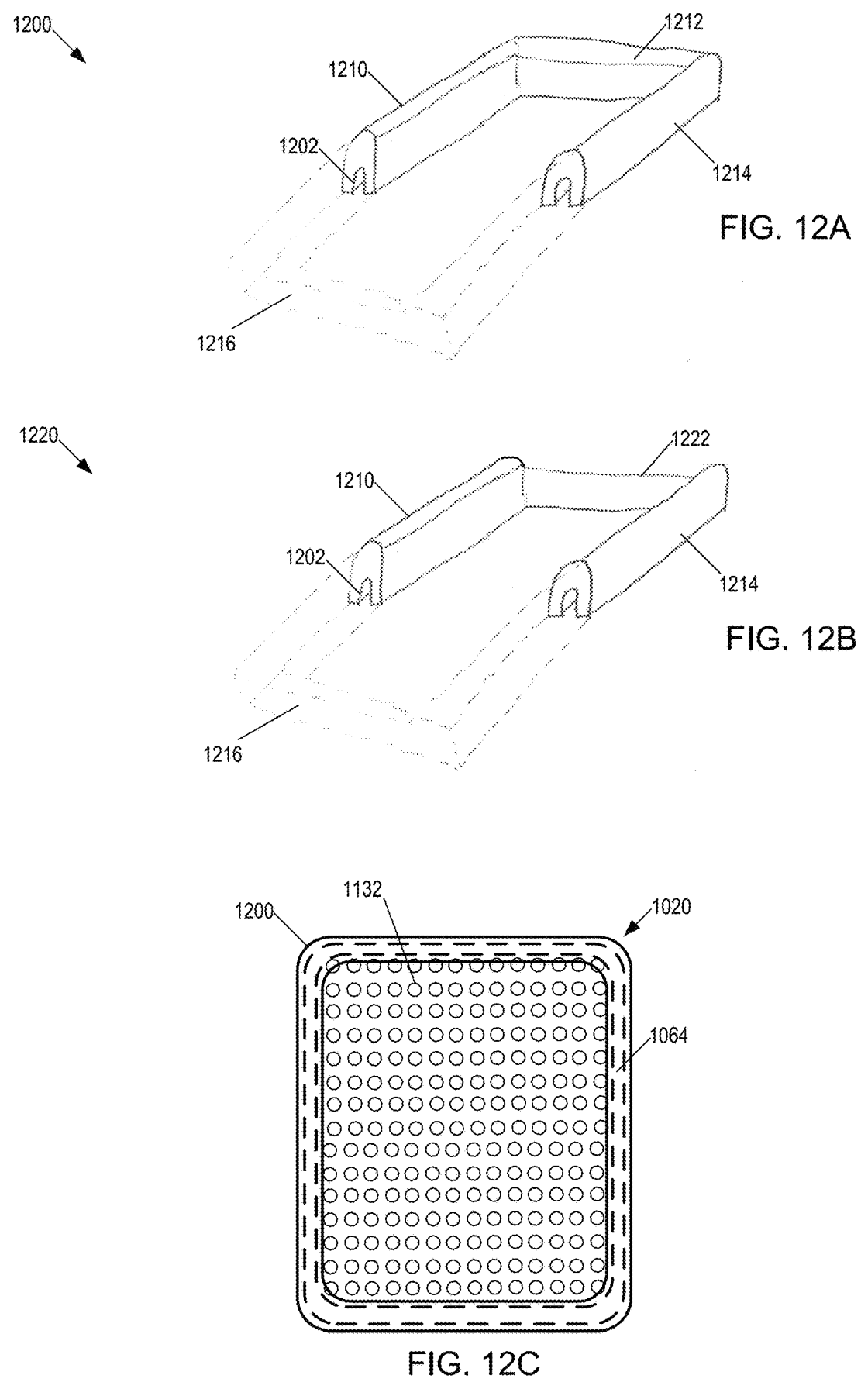

FIG. 12A is a front perspective view (with cutaway) of one example of the unitary clip structure 1200, with sides 1210, 1212, 1214, 1216. FIG. 12B is a front perspective view (with cutaway) of a modification 1220 of the unitary clip structure 1200, such as a single unitary structure, depicted in FIG. 12A of the clip structure, with one side modified (side 1212 in FIG. 12A modified to side 1222 in FIG. 12B). As shown, side 1222 is thinner than sides 1210, 1214, 1216 so that the FIG. 12C is a top view of the unitary clip structure 1200 (as depicted in FIG. 12A) on the upper layer. The unitary clip structure 1200 may include a cavity 1202 which may be shaped (see underside 1054) to mate with at least a part of the upper layer 1020, such as the rim of the upper layer 1020 (see upper side 1064).

The unitary clip structure 1200 may cover one or more sides of the upper layer 1020, such as one, two, three, four, or all sides of the upper layer 1020. As shown in FIG. 12C, the unitary clip structure 1200 covers all four of the upper side 1064 (shown in dashed lines) of upper layer 1020.

Figure 12D:
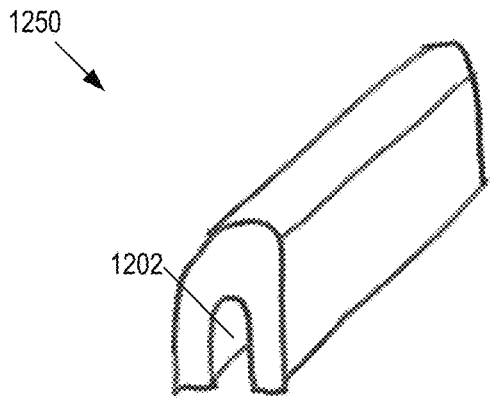
FIG. 12D is a front perspective view of another example of the clip structure.
Figure 12E:
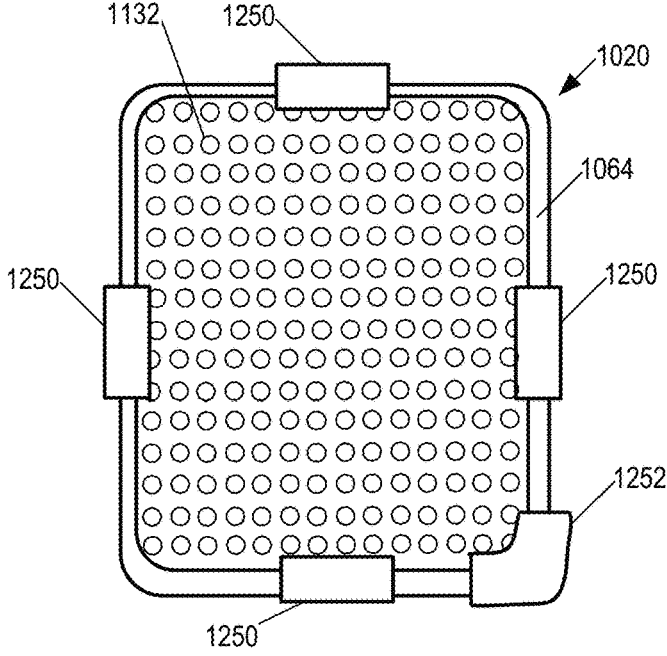
FIG. 12E is a top view of the clip structures on the upper layer.
Figure 12F:
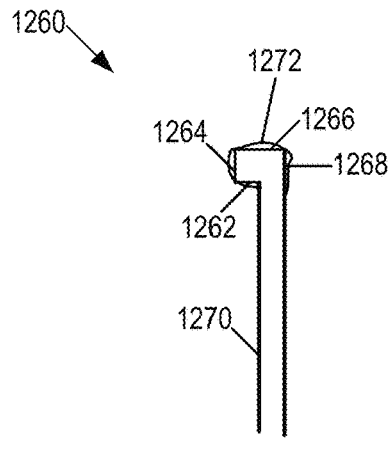
FIGS. 12F-G are a side cross-sectional views of still other examples of the clip structure.

FIG. 12D is a front perspective view of another example of the clip structure 1250. FIG. 12E is a top view of the clip structures 1250 on the upper side 1064 of the upper layer 1020. As shown, the clip structure covers less than an entirety of one side of the upper layer 1020, such as less than 70%, less than 60%, less than 50%, less than 40%, less than 30%, less than 20%, less than 10% of one side of the upper layer 1020. Alternatively, or in addition, the clip structure may cover two ends of sides of the upper layer, such as two ends that form a curve (see the clip structure 1252 may be at least partly curved as shown in FIG. 12E), or two ends that form a right angle. As shown in FIG. 12E, one clip structure 1252 is illustrated for one end. Alternatively, two, three or four clip structures 1252 may be placed on two, three or four ends. Further, as shown in FIG. 12E, the clip structure 1250 may be placed on one, two, three, four, or all sides of the upper side 1064 of upper layer 1020. In this way, the clip structure (such as unitary clip structure 1200 or clip structure(s) 1250) may hold the upper layer 1020.

Figure 12G:
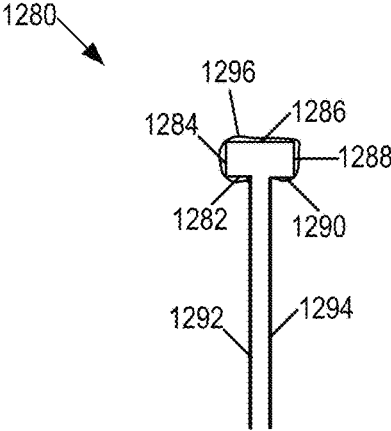

FIGS. 12F-G are a side cross-sectional views 1260, 1280 of still other examples of the clip structure. In FIG. 12F, the rim of the upper layer has surfaces 1262, 1264, 1266, and part of 1268 (upper layer further includes side 1270). In one or some embodiments, the clip may at least partly (or entirely) cover the rim of the upper layer. This is illustrated by clip 1272, which may comprise a one-piece flexible cord-type connector that encases the rim of the upper layer.

Similarly, FIG. 12G illustrates the rim of the upper layer, which has surfaces 1282, 1284, 1286, 1288, and 1290 (upper layer further includes sides 1292, 1294). In one or some embodiments, the clip may entirely cover or encircle the rim of the upper layer. This is illustrated by clip 1296, which may comprise a one-piece flexible cord-type connector that encases the rim of the upper layer.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. An animal litter box comprising:
a lower layer shaped to include a cavity therein;
an upper layer comprising a cellulose-based material and is shaped to include a cavity therein and to include a plurality of holes on at least one side of the cavity; and
a feeder section connected to the lower layer;
wherein the lower layer includes a rim that is configured to receive at least one middle layer for positioning between the lower layer and the upper layer, the upper layer being more rigid than the at least one middle layer; and
wherein the feeder section includes a cavity into which a box of animal feed or animal feed is inserted; and
wherein at least one side of the cavity includes at least one of:
an opening of the cavity that faces the upper layer and with the cavity of the feeder section configured to hold at least a part of a box of animal feed within; or
a grate and a mechanism to attach the grate to the feeder section.

2. The animal litter box of claim 1, further comprising a bracing structure adjacent or attached to an underside of the upper layer and configured to reinforce the upper layer;
wherein the bracing structure is a structure separate from the upper layer and the lower layer;
wherein the bracing structure is configured to seat on opposite sides of the rim of the lower layer;
wherein, without weight on the upper layer, the bracing structure and the upper layer have a gap therebetween; and
wherein, with the weight of an animal resting on an upper side of the upper layer, the bracing structure is configured to physically contact the upper layer.

3. The animal litter box of claim 2, wherein the underside of the upper layer has a shape; and
wherein an upper side of the bracing structure follows the shape of the underside of the upper layer so that at least a part of the upper side of the bracing structure contacts the underside of the upper layer with or without an animal resting upon an upper side of the upper layer.

4. The animal litter box of claim 3, wherein the bracing structure comprises a plurality of separate crossbeam structures, each of which are configured to seat on opposite sides of the rim of the lower layer.

5. The animal litter box of claim 3, wherein the bracing structure comprises a unitary structure that includes a plurality of crossbeam structures, with the unitary structure seating on opposite sides of the rim of the lower layer.

6. The animal litter box of claim 1, further comprising a bracing structure adjacent or attached to an underside of the upper layer and configured to reinforce the upper layer;
wherein the rim of the lower layer includes one or more indentations; and
wherein the one or more indentations are shaped to mate with the bracing structure in order for the bracing structure to be seated in the rim of the lower layer.

7. The animal litter box of claim 1, wherein the lower layer include at least one connector; and
wherein the feeder section is connected to the lower layer via the at least one connector.

8. The animal litter box of claim 1, wherein the animal litter box is for an animal;
wherein the cavity of the upper layer is configured for the animal to sit in to urinate and defecate;
wherein the plurality of holes sized to pass urine and feces of the animal through the upper layer; and wherein the opening of the cavity of the feeder section, when connected to the lower layer, is positioned relative to the upper layer and through which the animal sitting in the cavity of the feeder section eats the animal feed.

9. The animal litter box of claim 8, wherein the opening of the cavity in the feeder section is positioned over the cavity of the lower layer.

10. The animal litter box of claim 1, further comprising one or more clip structures configured to clip onto at least two sides of the rim of the upper layer.

11. The animal litter box of claim 10, wherein the one or more clip structures comprise a unitary structure.

12. An animal litter box comprising:

a lower layer shaped to include a cavity therein;

an upper layer comprising a cellulose-based material and is shaped to include a cavity therein and to include a plurality of holes on at least one side of the cavity;

a clip structure; and a feeder section connected to the lower layer that includes a cavity into which a box of animal feed or animal feed is inserted;

wherein the lower layer includes a rim that is configured to receive at least one middle layer for positioning between the lower layer and the upper layer, the upper layer being more rigid than the at least one middle layer;

wherein the rim of the lower layer has at least four sides; and wherein the clip structure comprises a single unitary structure configured to clip onto at least two sides of the at least four sides of the rim of the upper layer.

13. The animal litter box of claim 12, wherein the clip structure comprises the single unitary structure configured to clip at least three sides of the at least four sides of the rim of the upper layer.

14. The animal litter box of claim 12, wherein the clip structure entirely encircles the rim of the upper layer.

15. The animal litter box of claim 14, wherein the clip structure comprises flexible plastic configured to encircle the rim of the upper layer.

16. The animal litter box of claim 12, wherein the at least two sides of the rim comprise a first side and a second side;

wherein a curve joins the first side and the second side; and wherein the clip is curved to follow the curve that joins the first side and the second side.

17. The animal litter box of claim 12, further comprising a bracing structure adjacent or attached to an underside of the upper layer and configured to reinforce the upper layer; and wherein the bracing structure is a structure separate from the upper layer and the lower layer.

18. The animal litter box of claim 17, wherein the bracing structure is configured to seat on opposite sides of the rim of the lower layer;

wherein, without weight on the upper layer, the bracing structure and the upper layer have a gap therebetween; and wherein, with the weight of an animal resting on an upper side of the upper layer, the bracing structure is configured to physically contact the upper layer.

* * * * *